US011668943B2

(12) United States Patent
Luo et al.

(10) Patent No.: US 11,668,943 B2
(45) Date of Patent: *Jun. 6, 2023

(54) DISPLAY DEVICE HAVING DIFFRACTION GRATINGS WITH REDUCED POLARIZATION SENSITIVITY

(71) Applicant: Magic Leap, Inc., Plantation, FL (US)

(72) Inventors: Kang Luo, Austin, TX (US); Vikramjit Singh, Pflugerville, TX (US); Nai-Wen Pi, Plano, TX (US); Shuqiang Yang, Austin, TX (US); Frank Y. Xu, Austin, TX (US)

(73) Assignee: Magic leap, inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,921

(22) Filed: Apr. 8, 2022

(65) Prior Publication Data

US 2022/0229304 A1 Jul. 21, 2022

Related U.S. Application Data

(63) Continuation of application No. 16/930,897, filed on Jul. 16, 2020, now Pat. No. 11,327,315.
(Continued)

(51) Int. Cl.
*G02B 27/01* (2006.01)
*G02B 6/34* (2006.01)
*G02B 5/18* (2006.01)

(52) U.S. Cl.
CPC .......... *G02B 27/0172* (2013.01); *G02B 6/34* (2013.01); *G02B 27/0176* (2013.01); *G02B 2027/0178* (2013.01)

(58) Field of Classification Search
USPC .............................................. 345/7
See application file for complete search history.

(56) References Cited

U.S. PATENT DOCUMENTS

| 4,846,552 | A | 7/1989 | Veldkamp et al. |
| 6,850,221 | B1 | 2/2005 | Tickle |

(Continued)

FOREIGN PATENT DOCUMENTS

| FR | 2942549 A1 | 8/2010 |
| WO | WO 2021/016045 | 1/2021 |
| WO | WO 2021/050924 | 3/2021 |

OTHER PUBLICATIONS

International Search Report and Written Opinion for PCT Application No. PCT/US2020/042381, dated Nov. 4, 2020.
(Continued)

*Primary Examiner* — Chineyere D Wills-Burns
(74) *Attorney, Agent, or Firm* — Tobias Intellectual Property Law, PLLC

(57) ABSTRACT

Blazed diffraction gratings provide optical elements in head-mounted display systems to, e.g., incouple light into or out-couple light out of a waveguide. These blazed diffraction gratings may be configured to have reduced polarization sensitivity. Such gratings may, for example, incouple or outcouple light of different polarizations with similar level of efficiency. The blazed diffraction gratings and waveguides may be formed in a high refractive index substrate such as lithium niobate. In some implementations, the blazed diffraction gratings may include diffractive features having a feature height of 40 nm to 120 nm, for example, 80 nm. The diffractive features may be etched into the high index substrate, e.g., lithium niobate.

20 Claims, 36 Drawing Sheets

Related U.S. Application Data

(60) Provisional application No. 62/902,328, filed on Sep. 18, 2019, provisional application No. 62/876,205, filed on Jul. 19, 2019.

(56) References Cited

U.S. PATENT DOCUMENTS

| | | | |
|---|---|---|---|
| 8,064,138 B2 | 11/2011 | Taira et al. | |
| 8,619,363 B1 | 12/2013 | Coleman | |
| 9,081,426 B2 | 7/2015 | Armstrong | |
| 11,327,315 B2* | 5/2022 | Luo | G02B 6/34 |
| 2003/0016449 A1* | 1/2003 | Fabiny | G02B 5/1861 |
| | | | 359/571 |
| 2005/0174919 A1* | 8/2005 | Chang | G02B 27/283 |
| | | | 369/112.16 |
| 2005/0254753 A1 | 11/2005 | Naruse | |
| 2006/0028436 A1 | 2/2006 | Armstrong | |
| 2006/0066948 A1 | 3/2006 | Mizuyama | |
| 2007/0081123 A1 | 4/2007 | Lewis | |
| 2009/0161213 A1* | 6/2009 | Lin | G02B 5/1814 |
| | | | 359/641 |
| 2009/0190373 A1* | 7/2009 | Bita | G02B 6/0028 |
| | | | 362/620 |
| 2009/0296188 A1* | 12/2009 | Jain | G02F 1/13306 |
| | | | 349/16 |
| 2012/0127062 A1 | 5/2012 | Bar-Zeev et al. | |
| 2012/0162549 A1 | 6/2012 | Gao et al. | |
| 2013/0027713 A1* | 1/2013 | Kudenov | G01N 21/21 |
| | | | 356/491 |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0314897 A1* | 10/2014 | Ahn | B82Y 40/00 |
| | | | 427/383.1 |
| 2015/0016777 A1 | 1/2015 | Abovitz et al. | |
| 2015/0103306 A1 | 4/2015 | Kaji et al. | |
| 2015/0178939 A1* | 6/2015 | Bradski | H04N 13/00 |
| | | | 345/633 |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0327717 A1* | 11/2016 | Hashiya | G02B 5/1809 |
| 2017/0010466 A1* | 1/2017 | Klug | G02B 27/283 |
| 2017/0059879 A1 | 3/2017 | Vallius | |
| 2017/0131460 A1* | 5/2017 | Lin | G02B 6/0076 |
| 2017/0307886 A1* | 10/2017 | Stenberg | G02B 6/0035 |
| 2017/0322418 A1* | 11/2017 | Lin | H04N 13/344 |
| 2018/0052320 A1* | 2/2018 | Curtis | G06F 1/203 |
| 2018/0059297 A1* | 3/2018 | Peroz | H04N 9/3102 |
| 2018/0081176 A1 | 3/2018 | Olkkonen et al. | |
| 2018/0081265 A1 | 3/2018 | Singh | |
| 2018/0231702 A1* | 8/2018 | Lin | G03H 1/0244 |
| 2018/0239177 A1* | 8/2018 | Oh | G02B 5/30 |
| 2021/0033867 A1 | 2/2021 | Luo et al. | |
| 2021/0072437 A1* | 3/2021 | Singh | G02B 27/4272 |

OTHER PUBLICATIONS

International Search Report and Written Opinion for PCT Application No. PCT/US 20/50467, dated Dec. 10, 2020.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pcf.

Jacob, "Eye tracking in Advanced interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Preliminary Report on Patentability for PCT Application No. PCT/US2020/042381, dated Jan. 25, 2022.

International Preliminary Report on Patentability for PCT Application No. PCT/US 20/50467, dated Mar. 15, 2022.

* cited by examiner

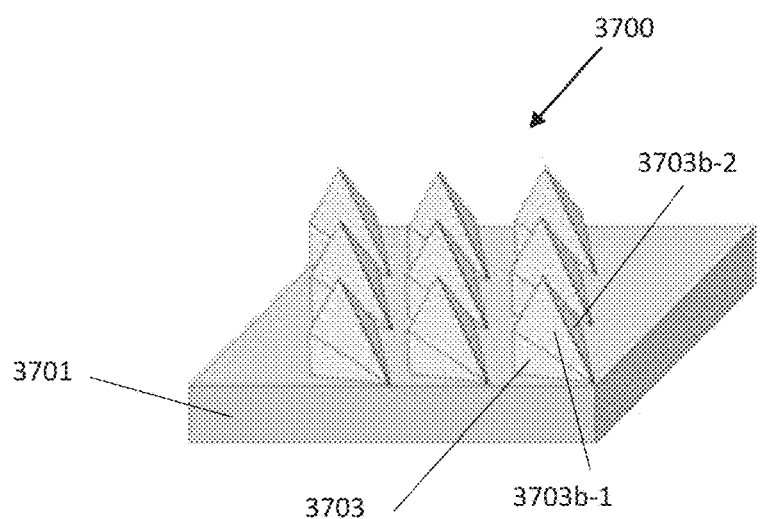 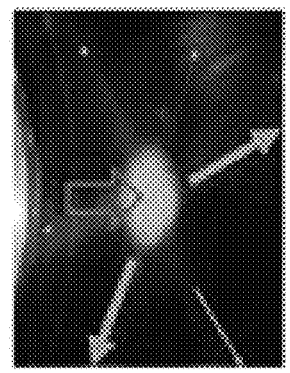
FIG. 19A  FIG. 19B

500
DISPLAY DEVICE HAVING DIFFRACTION GRATINGS WITH REDUCED POLARIZATION SENSITIVITY

CROSS-REFERENCE TO RELATED APPLICATIONS

This application is a continuation of U.S. patent application Ser. No. 16/930,897, filed Jul. 16, 2020, entitled "DISPLAY DEVICE HAVING DIFFRACTION GRATINGS WITH REDUCED POLARIZATION SENSITIVITY," which claims the benefit of priority to U.S. Provisional Application No. 62/876,205, filed Jul. 19, 2019, entitled "DISPLAY DEVICE HAVING DIFFRACTION GRATINGS WITH REDUCED POLARIZATION SENSITIVITY," and U.S. Provisional Application No. 62/902,328, filed Sep. 18, 2019, entitled "DISPLAY DEVICE HAVING DIFFRACTION GRATINGS WITH REDUCED POLARIZATION SENSITIVITY," the contents of which are hereby incorporated by reference in their entireties.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In an aspect, a head-mounted display system comprises a head-mountable frame, a light projection system configured to output light to provide image content, and a waveguide supported by the frame. The waveguide comprises a substrate comprising material having an index of refraction of at least 1.9. The substrate is configured to guide at least a portion of the light from the light projection system coupled into the waveguide. The head-mounted display system additionally comprises a blazed diffraction grating formed in the substrate or in a layer disposed over the substrate. The blazed diffraction grating has a first diffraction efficiency for a first polarization over a range of angles of light incident thereon and has a second diffraction efficiency for a second polarization over the range of angles of light incident thereon. The first diffraction efficiency is between 1 and 2 times the second diffraction efficiency.

In another aspect, an optical waveguide comprises a substrate comprising material having an index of refraction of at least 1.9. The substrate is configured to guide light coupled into the waveguide within the waveguide via total internal reflection. The optical waveguide additionally comprises a blazed diffraction grating formed in the substrate or in a layer disposed over the substrate. The blazed diffraction grating has a first diffraction efficiency for a first polarization over a range of angles for light incident thereon and has a second diffraction efficiency for a second polarization over the range of angles for light incident thereon. The first diffraction efficiency is between 1 and 2 times the second diffraction efficiency.

BRIEF DESCRIPTION OF THE DRAWINGS

FIG. 19A is a perspective view of a 2D diffraction grating having a two-dimensional array of diffractive features blazed in two directions.

FIG. 19B illustrates light being preferentially directed in different directions by a 2D diffraction grating having a two-dimensional array of diffractive features blazed in two directions.

Figure 1:
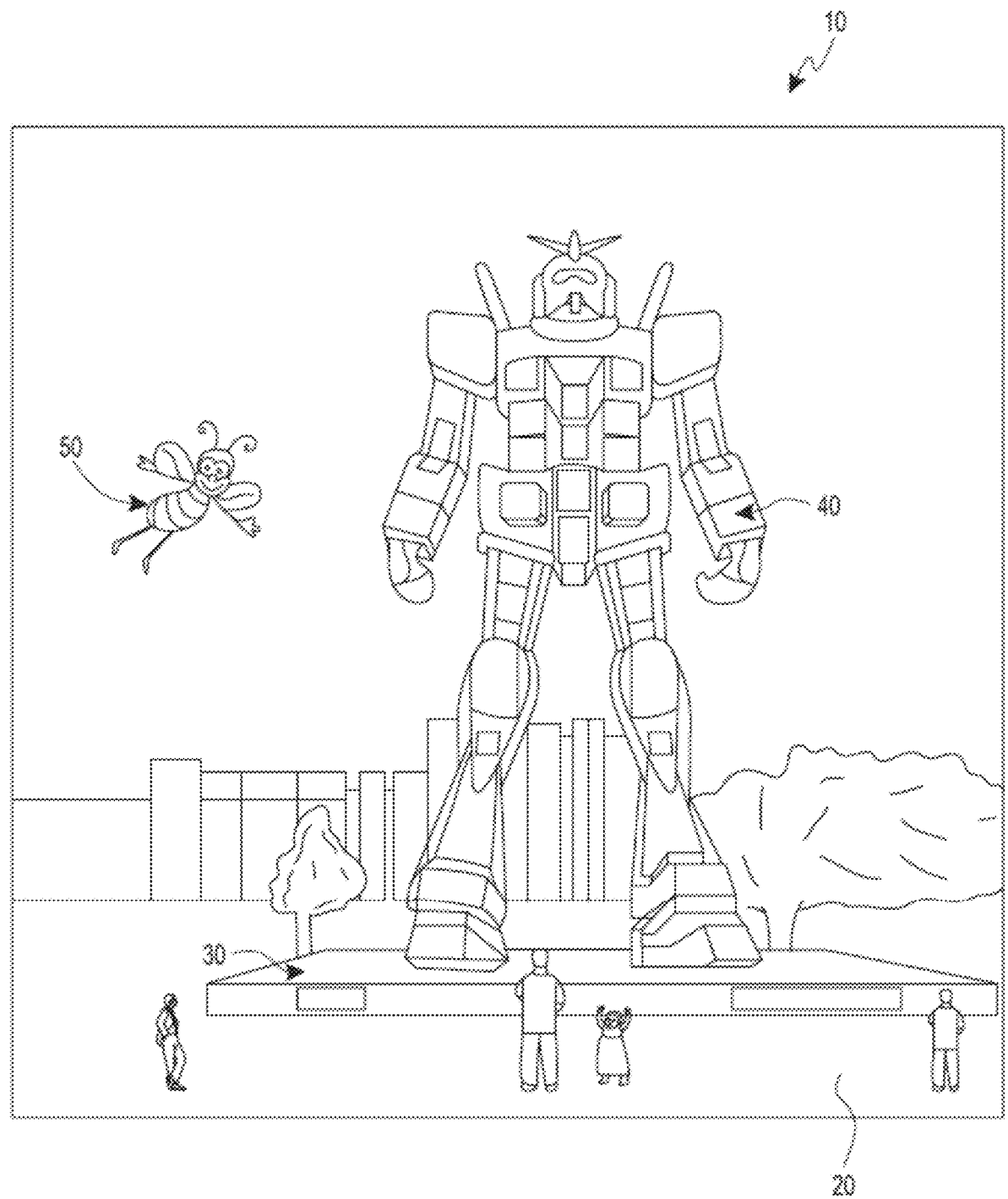
FIG. 1 illustrates a user's view of augmented reality (AR) through an AR device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, virtual/augmented/mixed display having a relatively high field of view (FOV) can enhance the viewing experience. The FOV of the display depends on the angle of light output by waveguides of the eyepiece, through which the viewer sees images projected into his or her eye. A waveguide having a relatively high refractive index, e.g., 2.0 or greater, can provide a relatively high FOV. However, to efficiently couple light into the high refractive index waveguide, the diffractive optical coupling elements should also have a correspondingly high refractive index. To achieve this goal, among other advantages, some displays for AR systems according to embodiments described herein include a waveguide comprising a relatively high index (e.g., greater than or equal to 2.0) material, having formed thereon respective diffraction gratings with correspondingly high refractive index, such as a Li-based oxide. For example, a diffraction grating may be formed directly on a Li-based oxide waveguide by patterning a surface portion of the waveguide formed of a Li-based oxide.

Some high refractive index diffractive optical coupling elements such as in-coupling or out-coupling optical elements have strong polarization dependence. For example, in-coupling gratings (ICGs) for in-coupling light into a waveguide wherein the diffractive optical coupling element comprises high refractive index material may admit light of a given polarization significantly more than light of another polarization. Such elements may, for example, in-couple light with TM polarization into the waveguide at a rate approximately 3 times that of light with TE polarization. Diffractive optical coupling elements with this kind of polarization dependence may have reduced efficiency (due to the poor efficiency and general rejection of one polarization) and may also create coherent artifacts and reduce the uniformity of a far field image formed by light coupled out of the waveguide. To obtain diffractive optical coupling elements that are polarization-insensitive or at least that have reduced polarization sensitivity (e.g., that couple light with an efficiency that is relatively independent of polarization), some displays for AR systems according to various implementations described herein include a waveguide with diffraction gratings formed with blazed geometries. The diffraction grating may also be formed directly in the waveguide, which may comprise high index material (e.g., having an index of refraction of at least 1.9, 2.0, 2.1, 2.2, 2.3, 2.4, 2.5, 2.6, or up to 2.7 or a value in any range between any of these values). A diffractive grating may, for example, be formed in high index materials such as such as Li-based oxide like lithium niobate ($LiNbO_3$) or lithium tantalate ($LiTaO_3$) or such as zirconium oxide ($ZrO_2$), titanium dioxide ($TiO_2$) or silicon carbide (SiC), for example, by patterning the high index material with a blazed geometry.

Reference will now be made to the drawings, in which like reference numerals refer to like parts throughout. Unless indicated otherwise, the drawings are schematic not necessarily drawn to scale.

Figure 2:
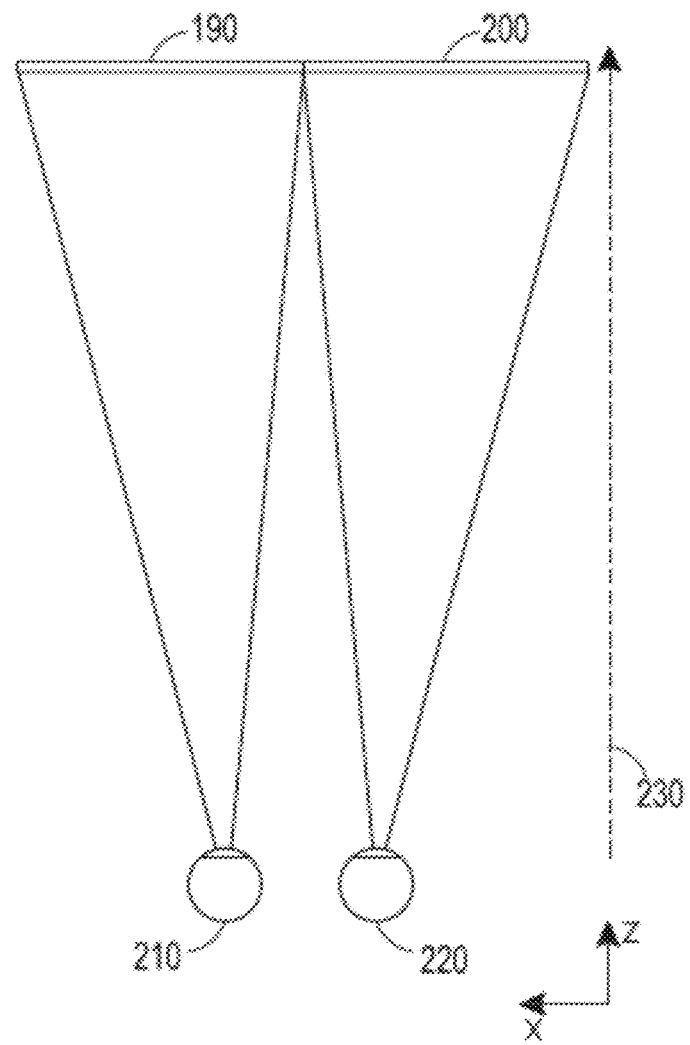
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
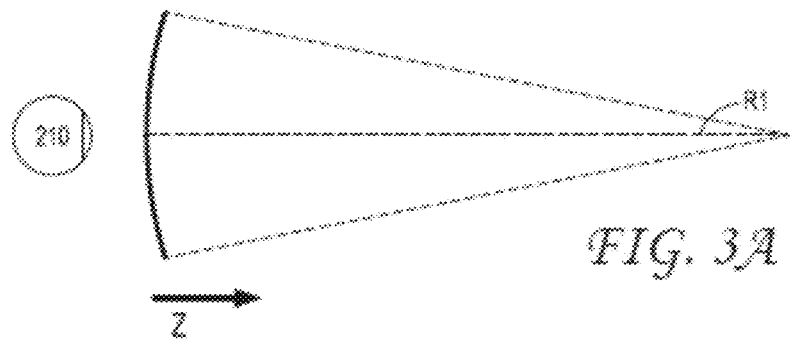
FIGS. 3A-3C illustrate relationships between radius of curvature and focal radius.
Figure 3B:
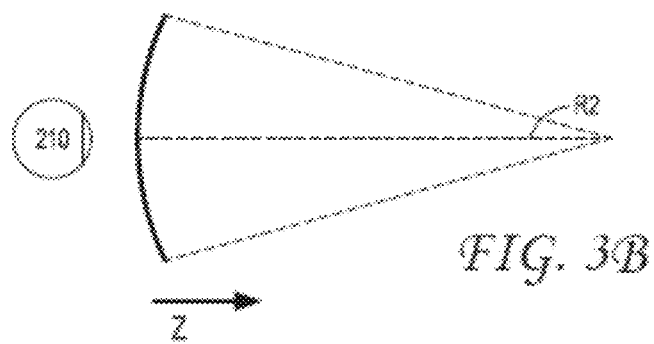
Figure 3C:
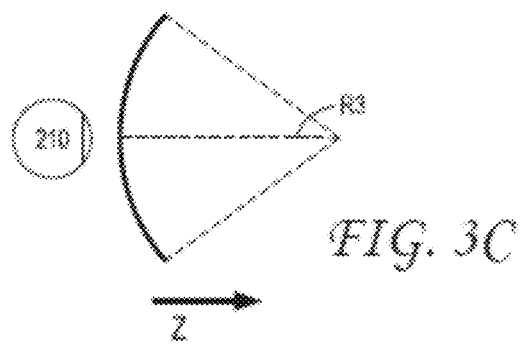

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
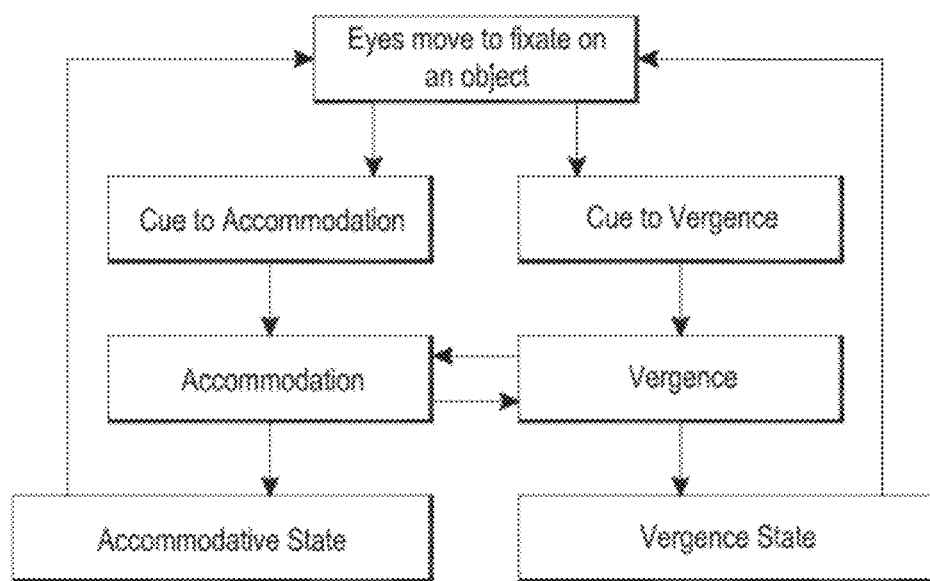
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
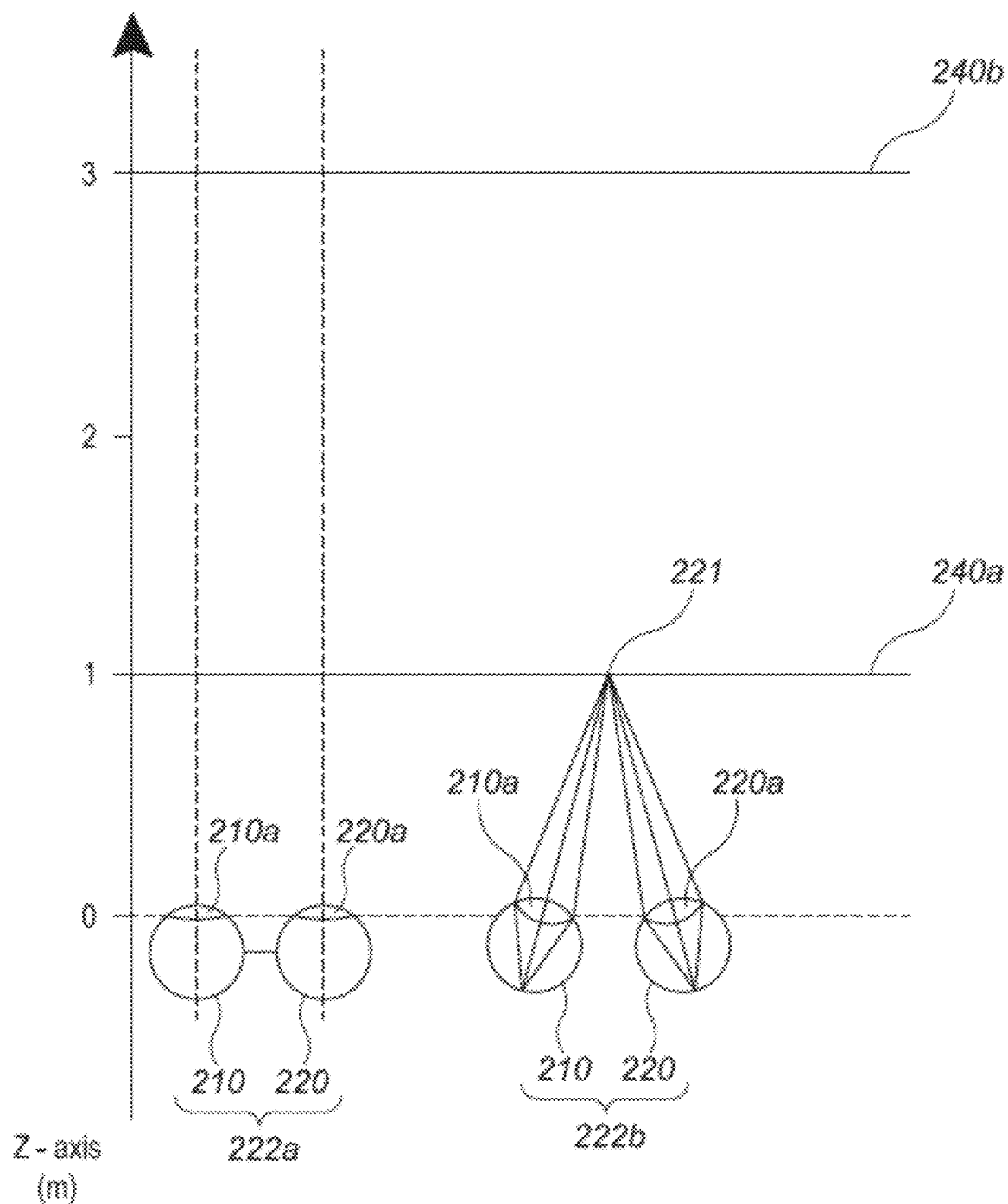
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
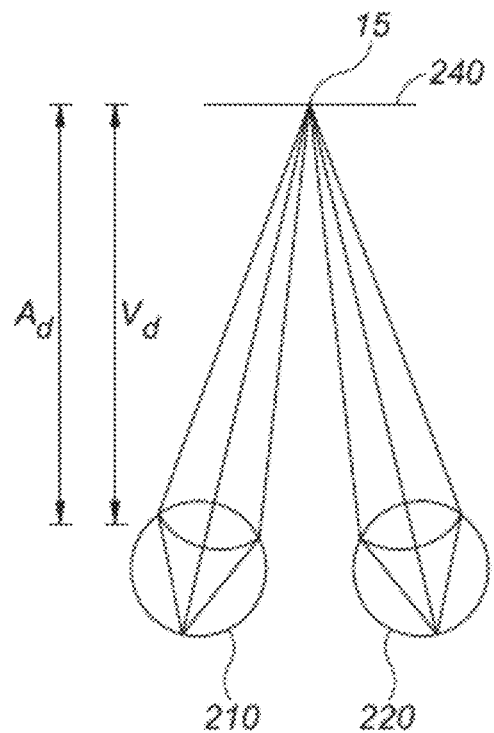
FIG. 4C illustrates an example of a representation of a top-down view of a user viewing content via a display system.
Figure 4D:
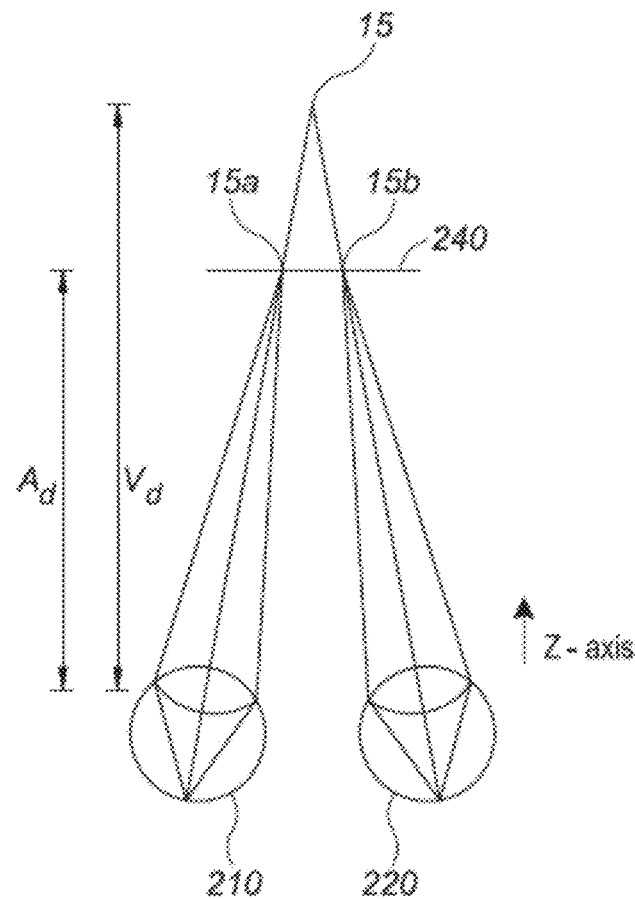
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
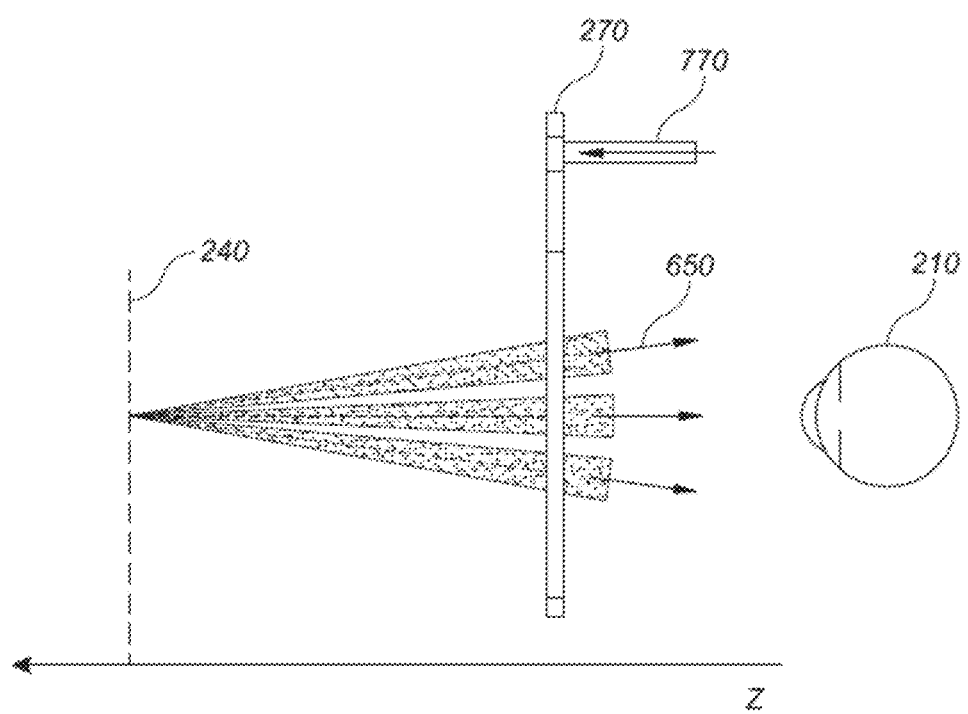
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
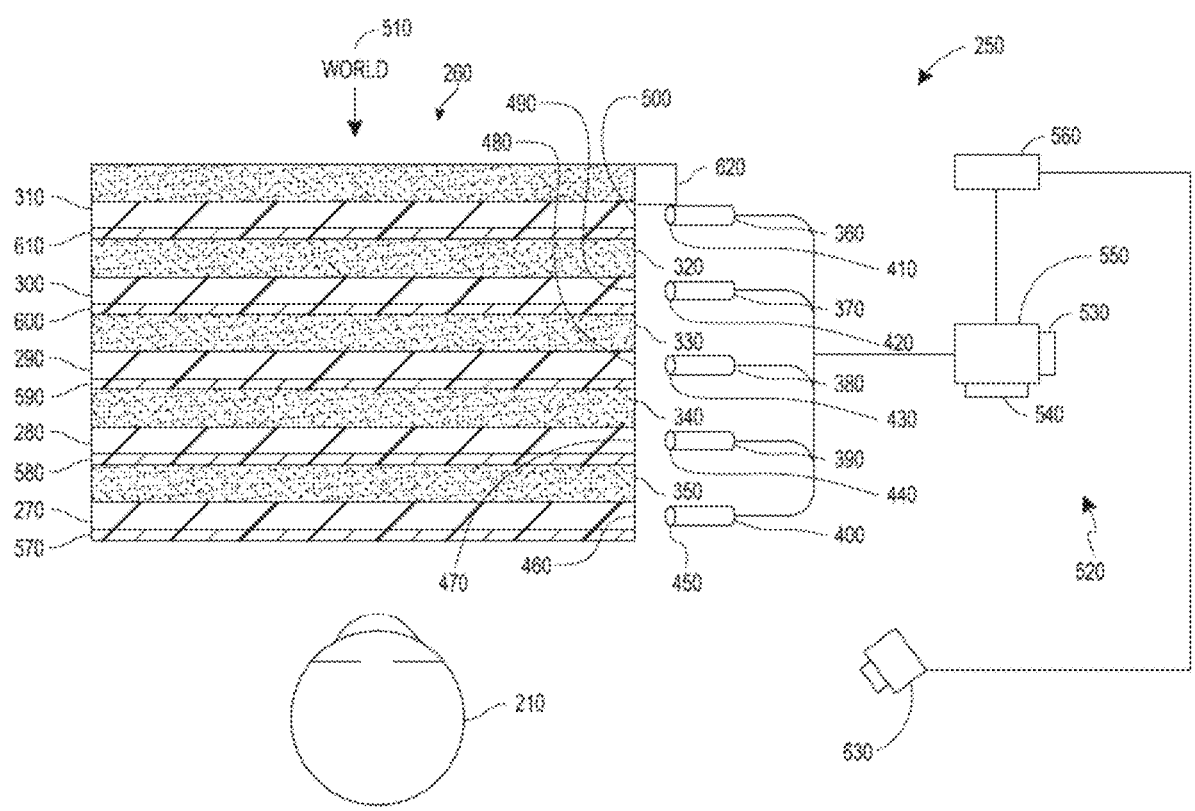
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
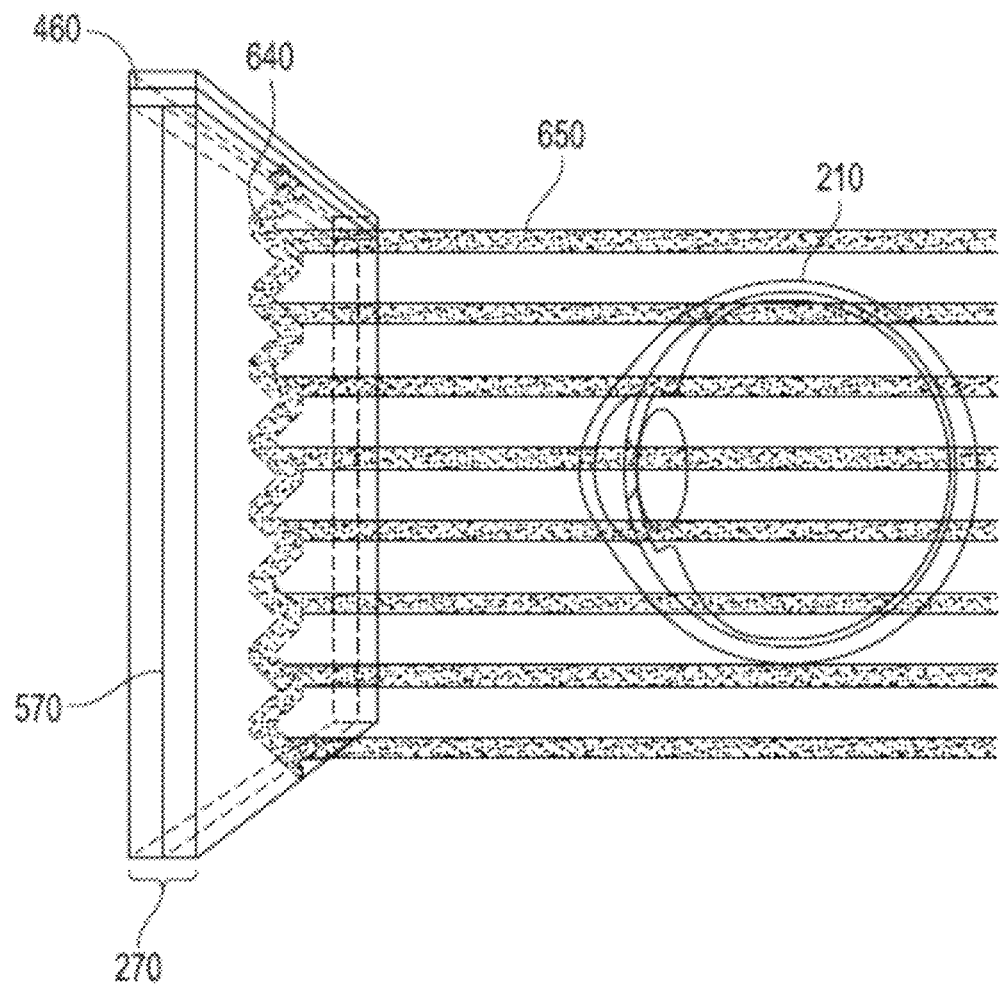
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
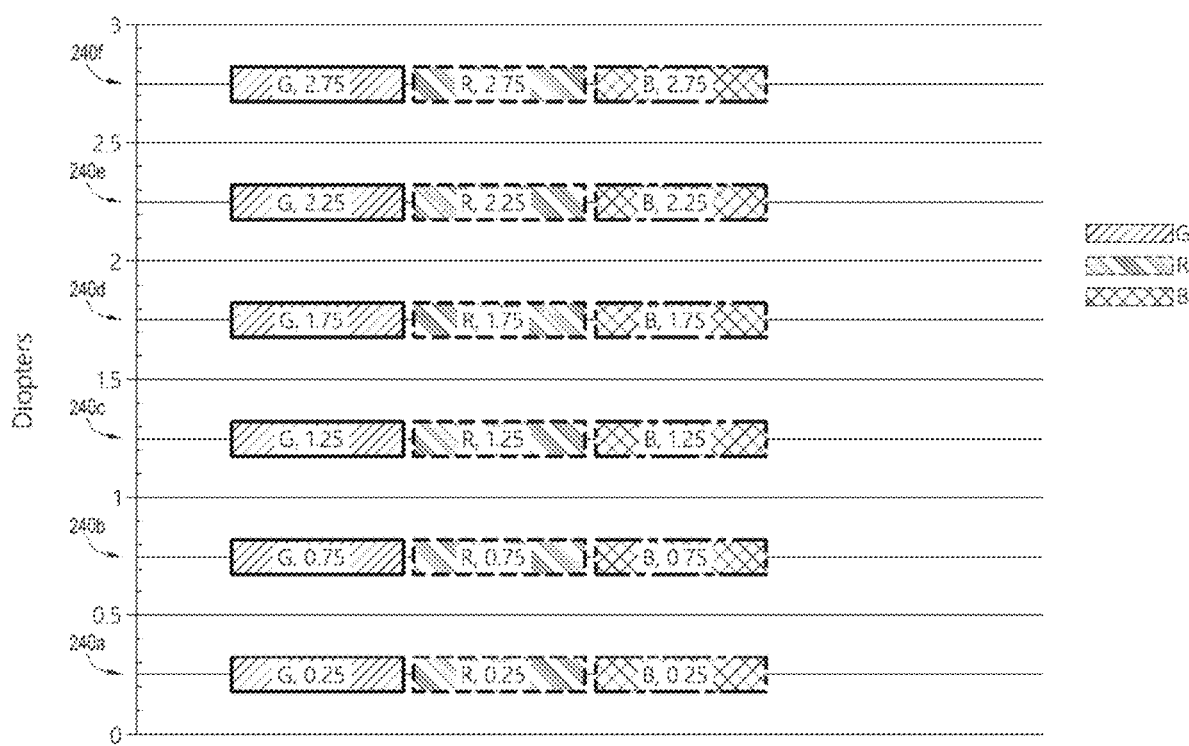
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
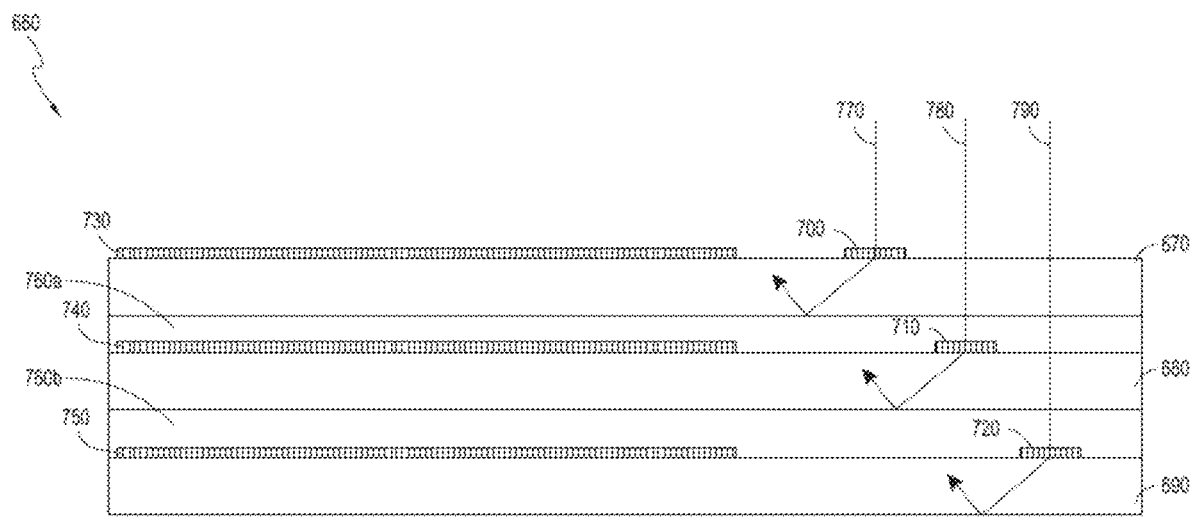
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate total internal reflection (TIR) of light through the waveguides 670, 680, 690 (e.g., TIR between the top and bottom major surfaces of each waveguide). In some embodiments, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some embodiments, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
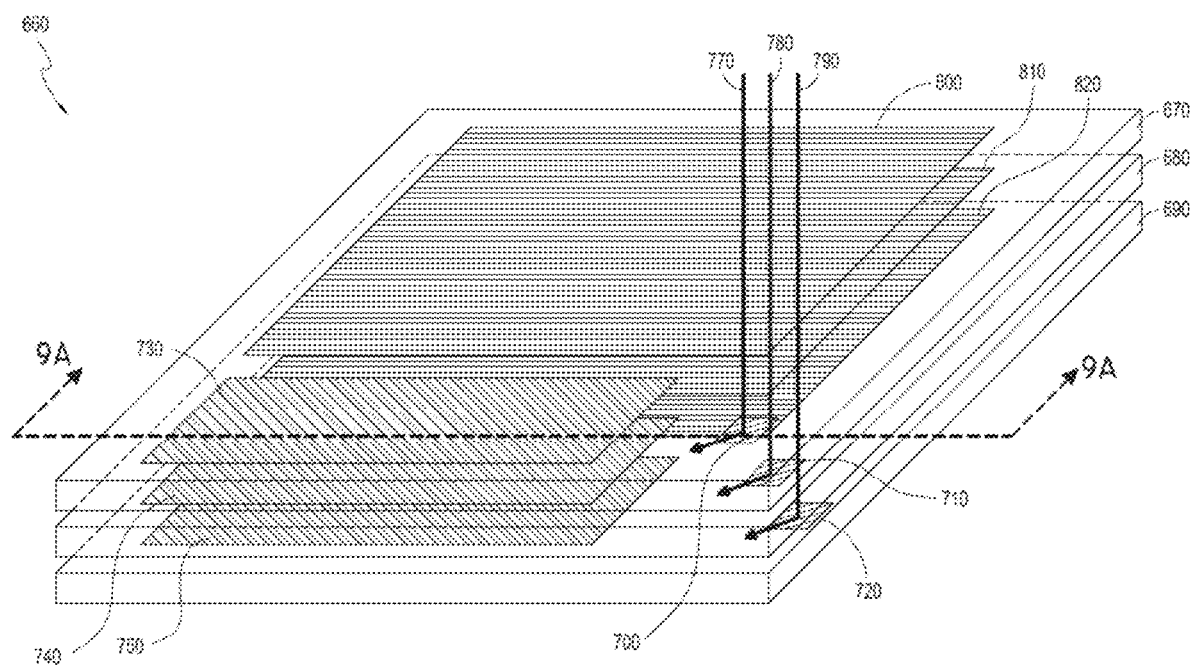
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
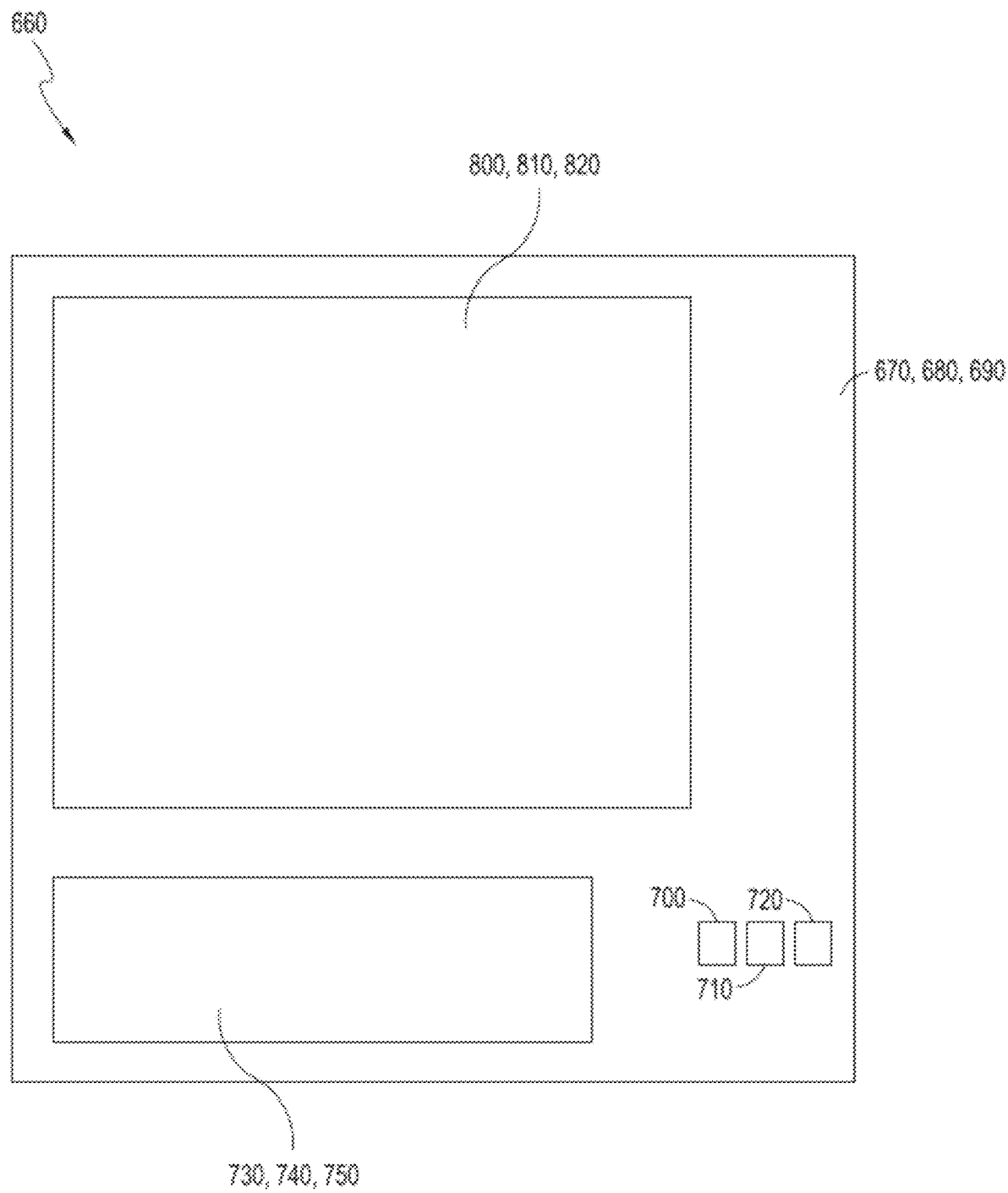
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
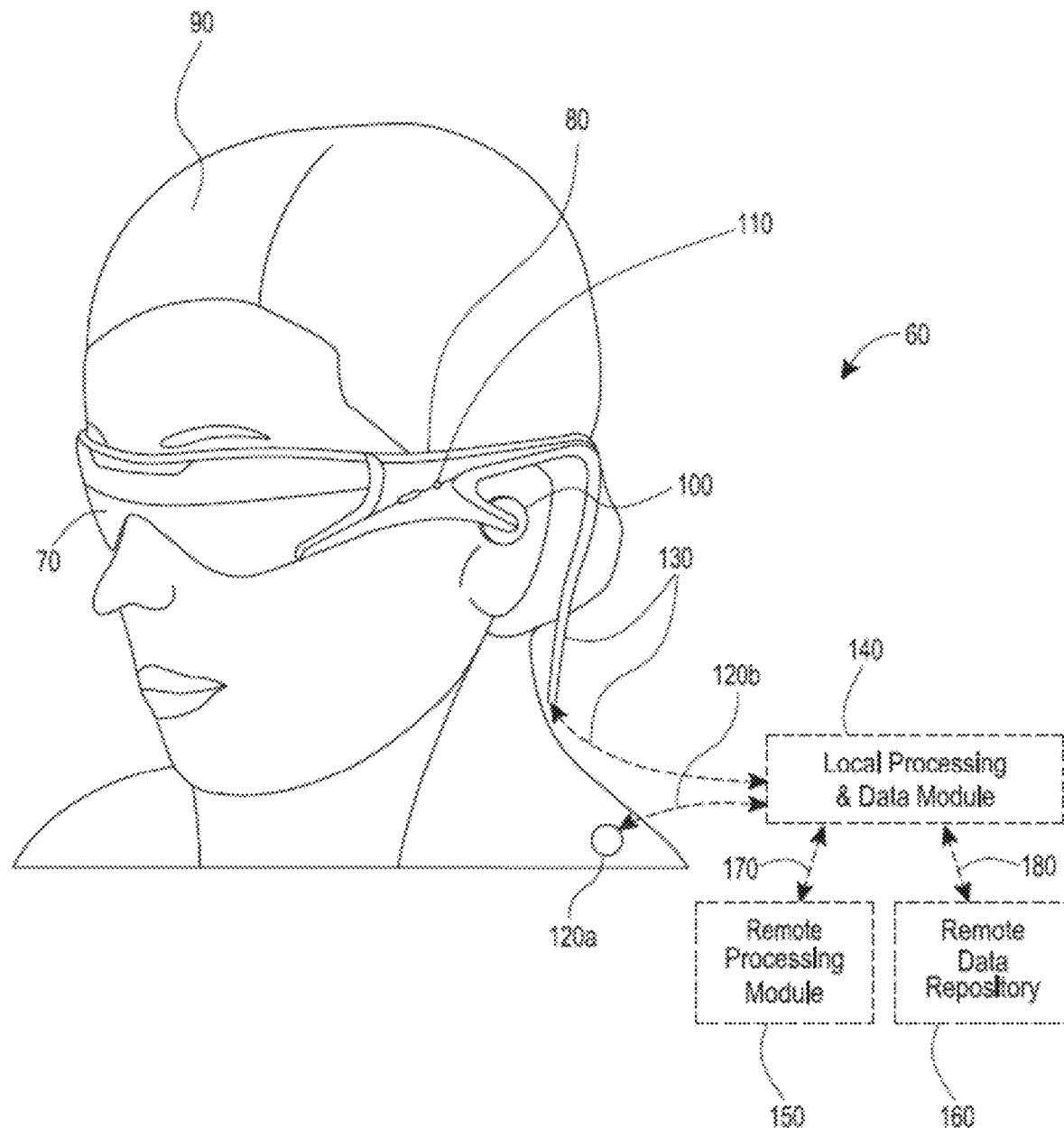
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Diffraction Gratings Having Reduced Polarization Sensitivity

Providing a high quality immersive experience to a user of waveguide-based display systems such as various display systems configured for virtual/augmented/mixed display applications described supra, depends on, among other things, various characteristics of the light coupling into and/or out of the waveguides in the eyepiece of the display systems. For example, a virtual/augmented/mixed display having high light incoupling and outcoupling efficiencies can enhance the viewing experience by increasing brightness of the light directed to the user's eye. As discussed above, in-coupling optical elements such as in-coupling diffraction gratings may be employed to couple light into the waveguides to be guided therein by total internal reflection. Similarly, out-coupling optical elements such as out-coupling diffraction gratings may be employed to couple light guided within the waveguides by total internal reflection out of the waveguides.

As described supra, e.g., in reference to FIGS. 6 and 7, display systems according to various implementations described herein may include optical elements, e.g., in-coupling optical elements, out-coupling optical elements, light distributing elements, and/or combined pupil expander-extractors (CPEs) that may include diffraction gratings. As disclosed herein, a CPE may operate both as a light distributing element spreading or distributing light within the waveguide, possibly increasing beam size and/or the eye box, as well as an out-coupling optical element coupling light out of the waveguide.

For example, as described above in reference to FIG. 7, light 640 that is injected into the waveguide 270 at the input surface 460 of the waveguide 270 propagates and is guided within the waveguide 270 by total internal reflection (TIR). In various implementation, at points where the light 640 impinges on the out-coupling optical element 570, a portion of the light guided within the waveguide may exit the waveguide as beamlets 650. In some implementations, any of the optical elements 570, 580, 590, 600, 610, which may include one or more of an incoupling optical element, an outcoupling optical element, a light distribution element or a CPE, can be configured as a diffraction grating.

To achieve desirable characteristics of in-coupling of light into (or out-coupling of light from) the waveguides 270, 280, 290, 300, 310, the optical elements 570, 580, 590, 600, 610 configured as diffraction gratings can be formed of a suitable material and have a suitable structure for controlling various optical properties, including diffraction properties such as diffraction efficiency as a function of polarization. Possible desirable diffraction properties may include, among other properties, any one or more of the following: spectral selectivity, angular selectivity, polarization selectivity (or non-selectivity), high spectral bandwidth, high diffraction efficiencies or a wide field of view (FOV).

Some diffraction gratings have strong polarization dependence and thus may have relatively diminished overall efficiency (due to the rejection of one polarization). Such diffraction gratings may also create coherent artifacts and reduce the uniformity of a far field image. To provide diffraction gratings that have reduced polarization sensitivity (e.g., that couple light with an efficiency that is relatively independent of polarization), some displays for AR systems according to implementation described herein include a waveguide with blazed diffraction gratings formed therein. The blazed grating may, for example, comprise diffractive features having a "saw tooth" shape. In some implementations, a blazed grating may achieve enhanced grating diffraction efficiency for a given diffraction order, while the diffraction efficiency for the other orders is reduced or minimized. As a result, more light may be directed into the particular given diffractive order as opposed to any of the other orders in some implementations.

Figure 10A:
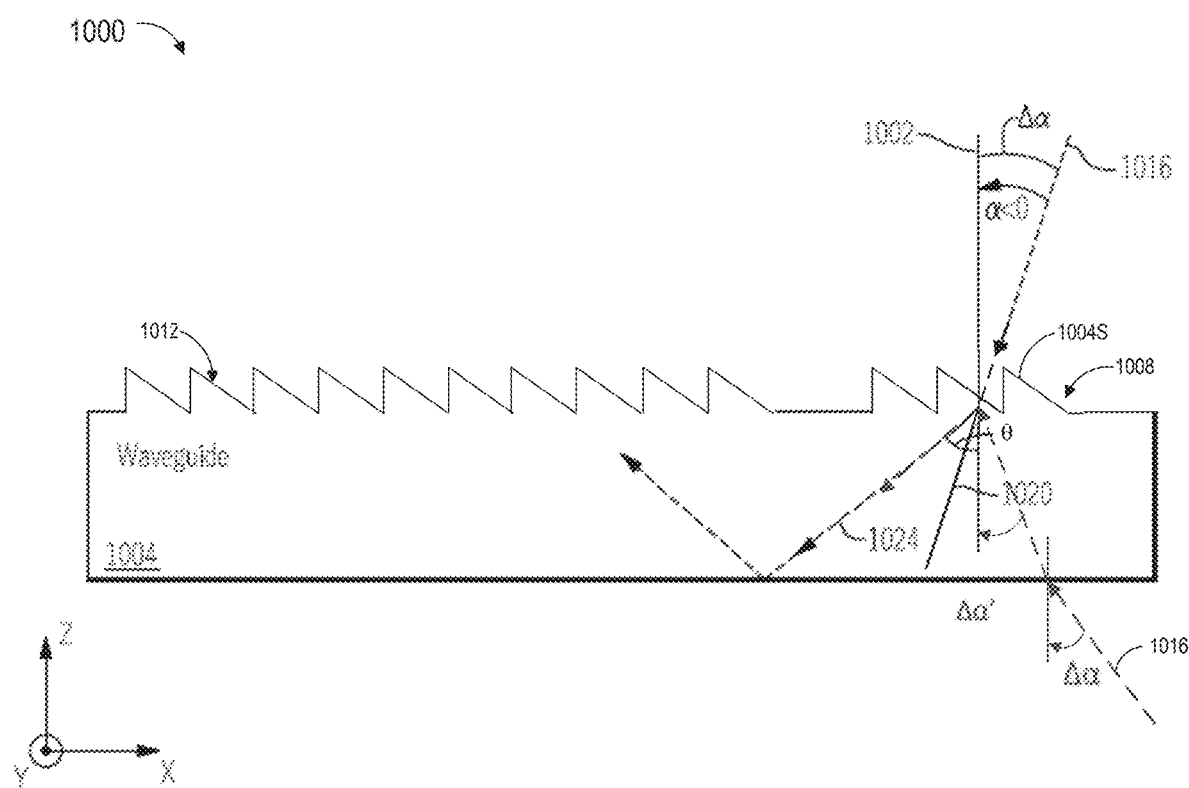
FIG. 10A schematically illustrates a cross-sectional view of a portion of a waveguide having disposed thereon a diffraction grating, for example, for in-coupling light into the waveguide.

FIG. 10A illustrates a cross-sectional view of a portion of a display device 1000 such as an eyepiece comprising a waveguide 1004 and a blazed diffraction grating 1008 formed on the substrate that is a waveguide 1004, according to some designs described herein. In the implementation shown, the blazed diffraction grating 1008 is formed in the substrate/waveguide 1004 (which, in this example, is planar). The surface of the substrate or waveguide 1004 has a surface topography comprising diffractive features that together form the diffraction grating 1008. The blazed diffraction grating 1008 is configured to diffract light having a wavelength in the visible spectrum such that the light incident thereon is guided within the waveguide 1004 by TIR. The waveguide 1004 may be transparent and may form part of an eyepiece through which a user's eye can see. Such a waveguide 1004 and eyepiece may be include in a head mounted display such as an augmented reality display. The waveguide 1004 can correspond, for example, to one of waveguides 670, 680, 690 described above with respect to FIGS. 9A-9C, for example. The blazed diffraction grating 1008 can correspond to one of the in-coupling optical elements 700, 710, 720 described above with respect to FIGS. 9A-9C, for example. The blazed diffraction grating 1008 configured to in-couple light into the waveguide 1004 may be referred to herein as an in-coupling grating (ICG). The display device 1000 may additionally include an optical element 1012, that can correspond, for example, to a light distributing element (e.g., one of the light distributing elements 730, 740, 750 shown in FIGS. 9A-9C), or an out-coupling optical element (e.g., one of the out-coupling optical elements 800, 810, 820 shown in FIGS. 9A-9C).

In operation, when an incident light beam 1016, e.g., visible light, such as from a light projection system that provide image content is incident on the blazed diffraction grating 1008 at an angle of incidence, a, measured relative to a plane normal 1002 that is normal or orthogonal to the extended surface or plane of the blazed diffraction grating or the substrate/waveguide and/or the surface 1004S of the waveguide 1004, for example, a major surface of the waveguide on which the grating is formed (shown in FIG. 10A as extending parallel to the y-x plane), the blazed diffraction grating at least partially diffracts the incident light beam 1016 as a diffracted light beam 1024 at a diffraction angle θ measured relative to the plane normal 1002. When the diffracted light beam 1024 is diffracted at a diffraction angle θ that exceeds a critical angle $\theta_{TIR}$ for occurrence of total internal reflection in the waveguide 1004, the diffracted light beam 1024 propagates and is guided within the waveguide 1004 via total internal reflection (TIR) generally along a direction parallel to the x-axis and along the length of the waveguide. A portion of this light guided within the waveguide 1004 may reach one of light distributing elements 730, 740, 750 or one of out-coupling optical elements (800, 810, 820, FIGS. 9A-9C), for example, and be diffracted again.

As described herein, a light beam that is incident at an angle in a clockwise direction relative to the plane normal 1002 (i.e., on the right side of the plane normal 1002) as in the illustrated implementation is referred to as having a negative α (α<0), whereas a light beam that is incident at an angle in a counter-clockwise direction relative to the plane normal 1002 (i.e., on the left side of the plane normal) is referred to as having a positive α (α>0).

As further described elsewhere in the specification, a suitable combination of high index material and/or the structure of the diffraction grating 1008 may result in a particular range (Aa) of angle of incidence α, referred to herein as a range of angles of acceptance or a field-of-view (FOV). One range, Δα, may be described by a range of angles spanning negative and/or positive values of α, outside of which the diffraction efficiency falls off by more than 10%, 25%, more than 50%, or more than 75%, 80%, 90%, 95%, or any value in a range defined by any of these values, relative to the diffraction efficiency at α=0 or some other direction. In some implementations, having Δα within the range in which the diffraction efficiency is relatively high and constant may be desirable, e.g., where a uniform intensity of diffracted light is desired within the Δα. Thus, in some implementations, Δα is associated with the angular bandwidth of the diffraction grating 1008, such that an incident light beam 1016 within the Δα is efficiently diffracted by the diffraction grating 1008 at a diffraction angle θ with respect to the surface normal 1002 (e.g., a direction parallel to the y-z plane) wherein θ exceeds $\theta_{TIR}$ such that the diffracted light is guided within the waveguide 1004 under total internal reflection (TIR). In some implementations, this angle Δα range may affect the field-of-view seen by the user. It will be appreciated that, in various implementations, the light can be directed onto the in-coupling grating (ICG) from either side. For example, the light can be directed through the substrate or waveguide 1004 and be incident onto a reflective in-coupling grating (ICG) 1008 such as the one shown in FIG. 10A. The light may undergo the same effect, e.g., be coupled into the substrate or waveguide 1004 by the in-coupling grating 1008 such that the light is guided within substrate or waveguide by total internal reflection. The range (Δα) of angle of incidence α, referred to herein as a range of angles of acceptance or a field-of-view (FOV) may be effected by the index of refraction of the substrate or waveguide material. In FIG. 10A, for example, a reduced range of angles (Δα'), shows the effects of refraction of the high index material on the light incident on the in-coupling grating (ICG). The range of angles (Δα) or FOV, however, is larger.

Figure 10B:
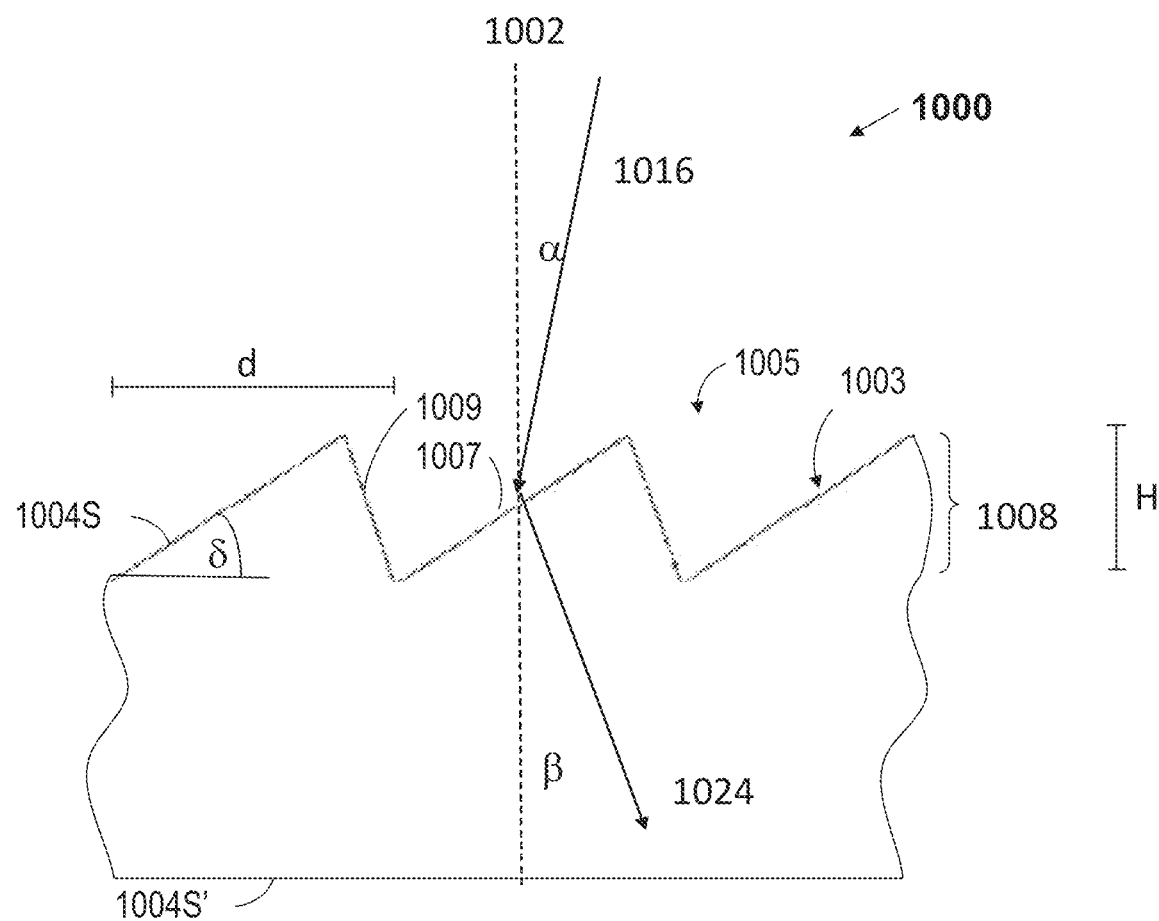
FIG. 10B illustrates a cross-sectional view of a waveguide having disposed thereon a blazed diffraction grating showing a field-of-view (FOV) of the waveguide, $\Delta\alpha$.

FIG. 10B illustrates a cross-sectional view of an example blazed transmission diffraction grating 1008. The grating 1008 comprises grating features having peaks 1003 and grooves 1005. The blazed transmission grating 1008 comprises a surface corresponding to the surface of the substrate or waveguide 1004S having a "sawtooth" shape pattern as viewed from the cross-section shown. The "sawtooth" patterned is formed by first sloping portions 1007 of the surface 1004S. In the example shown in FIG. 10B, the grating 1008 also includes second (steeper) sloping portions 1009. In the example shown, the first sloping portions 1007 have a shallower inclination than the second sloping portions 1009, which have a steeper inclination. The first sloping portions 1007 also are wider than the second sloping portions 1009 in this example.

The peaks 1003 have heights, H, corresponding to the distance from the bottom of the groove 1005 to the top of the peak 1003. Accordingly, this value may be referred to herein as the peak height and/or groove depth, as the grating height or grating depth or as the height of the diffractive features of the diffraction grating. In the example shown in FIG. 10B, the bottom of the groove 1005 is formed by an intersection of the first and second sloping portions 1007, 1009 of two adjacent peaks 1003. The first sloping portion 1007 is on one of the adjacent peaks 1003 and the second sloping portion 1009 is on the other adjacent peak. Similarly, the top of the peak 1003 is formed by an intersection of the first and second sloping portions 1007, 1009 at the top of the peak 1003. Other configurations, however, are possible. For example, the first and second sloping portions may not necessarily intersect, for example, if the bottom of the groove 1005 has a flat base or if the top of the peak 1003 includes a flat plateau as will be discussed below. The blazed diffraction grating 1008 has a line spacing or pitch, d, which may be constant in some implementations. This line spacing or pitch, d, may be a measure, for example, of the separation the apex's of the peaks 1003 in the grating 1008 having a similar shape as that shown in FIG. 10B. Similarly, the line spacing or pitch, d, may be a measure of the separation of the deepest location of adjacent grooves 1005. The line spacing or pitch, d, may be measured from other positions on the grating features.

The slopes can be tilted at an angle, δ, with respect to a plane parallel to the surface of the grating 1008 or waveguide (e.g., the surface 1004S of the waveguide, which may extend beyond the grating or the surface 1004S' of the waveguide opposite the grating of FIG. 10A). This angle, δ, of the first (shallower) sloping portion 1007 may be referred to herein as the blaze angle.

As illustrated in FIG. 10B, the blazed diffraction grating 1008 can include grating lines or features that have asymmetric shape, for example, that comprise asymmetrically shaped peaks 1003 and/or grooves 1005. For example, in the diffraction grating shown in FIG. 10B, the diffraction features comprise peaks 1003 and/or grooves 1005 having an asymmetrical triangular cross-sectional shape. As discussed above, this asymmetric shape results in the different inclinations and/or widths of the first and second sloping portions 1007, 1009. Other shapes, however, are possible.

In designs where the diffraction features are asymmetric, for example, where the inclination of the first sloping portion is shallower while the slope of the second sloping portion is steeper, the diffraction features may be considered to be formed from repeating slopes and steps. Such structures may be referred to herein as a tilted step structure. In some implementations, the second portion may be so steep as to not slope; for example, the second portion may be parallel to the normal 1002.

In other implementations of the "sawtooth" pattern, however, the peaks 1003 and/or grooves 1005 may be symmetric. For example, the first and second sloping portions 1007, 1009 may have the same inclination and be the same width.

The cross-section pattern shown in FIG. 10B may be referred to herein as a single-step geometry, in comparison to a multi-step structure, which is discussed below. A multi-step structure, for example, is shown in FIG. 11D.

Regardless of whether the diffraction features are asymmetric or symmetric, in some implementations, a plateau or flat portion may be located at the top of the peak 1003 as will be discussed below. Diffraction gratings 1008 comprising diffraction features having plateaus or flat portions on top of the peaks 1003 are shown, for example, in FIGS. 11B and 11D.

FIG. 10B shows an incident light beam 1016 incident on the grating 1008 at an angle α with respect to the normal direction 1002. (As discussed above with regard to FIG. 10A, the light can pass through the substrate or waveguide 1004 and be incident on the diffraction grating 1008 from the other side in other examples.) As discussed above, the normal 1002 is normal or orthogonal to the extended surface of the blazed diffraction grating 1008 or the plane of the grating or waveguide and/or the surface 1004S of the waveguide 1004, for example, a major surface of the waveguide on which the grating is formed or the opposite planar surface 1004S'. In FIG. 10B, the light 1016 incident on the diffraction grating 1008 is shown as diffracted at an angle β with respect to the normal direction 1002.

According to various embodiments, when configured as an in-coupling optical element or an in-coupling diffraction grating, the diffraction grating 1008 can diffractively couple light incident into the substrate 1004, which can be a waveguide as described above. The diffraction grating 1008 may, if desired, be configured as an out-coupling optical element and, in such embodiments, can diffractively couple light from the substrate 1004, which can be a waveguide also as described above.

Referring to FIGS. 10A and 10B, in some implementations, the substrate 1004 comprises a high index material having an index of refraction of at least 1.9. The index of refraction, for example, can be at least 2.0, at least 2.1, at least 2.2, or at least 2.3 and may be no more than 2.4, 2.5, 2.6, 2.7, 2.8, or may be in any range formed by any of these values or may be outside these ranges. In some implementations, for example, the substrate comprises a Li-based oxide. In various examples disclosed herein, the diffractive features of the diffractive grating 1008 may be formed at a surface of the substrate 1004. The diffractive features may either be formed in the substrate 1004, e.g., a waveguide, or in a separate layer formed over the substrate 1004, e.g., a waveguide, and configured to optically communicate with the substrate 1004, e.g., couple light into or out of the substrate 1004. In the illustrated example, the diffractive features of the diffraction grating 1008 such as lines are formed in the substrate 1004 such as in the surface of the substrate. The diffractive features, for example, may be etched into the substrate 1004 comprising high index material such as a Li-based oxide. The substrate may, for example, comprise lithium niobate and the diffractive grating may be formed in the lithium niobate substrate by etching or patterning the surface of the substrate. Other materials having high refractive index may also be used. For example, other materials comprising lithium such as lithium oxides, e.g., lithium tantalate (LiTaO$_3$) may be employed as a substrate. Silicon carbide (SiC) is another option for the substrate material. Examples are not so limited. In other examples, the diffractive features of the diffractive grating 1008 may be formed in a separate layer disposed over, e.g., physically contacting, the substrate 1004. For example, a thin film coating of under 200 nm thickness of zinc oxide (ZnO), silicon nitride (Si$_3$N$_4$), zirconium dioxide (ZrO$_2$), titanium dioxide (TiO$_2$), silicon carbide (SiC), etc., may be disposed over an existing high index substrate. The thin film coating may be patterned to form the diffractive features. In some implementations, however, diffractive features, such as lines, of a diffraction grating 1008 may be formed of a material different from that of the substrate. The substrate may, for example, comprise a high index material such as a Li-based oxide (e.g., lithium niobate, LiNbO$_3$, or lithium tantalate, LiTaO$_3$), however, the diffractive features may be formed from a different material such as coatings of zinc oxide (ZnO), zirconium dioxide (ZrO$_2$), titanium dioxide (TiO$_2$), silicon carbide (SiC) or other materials described herein. In some implementations, this other material formed on the substrate may have a lower index of refraction. In some cases, the substrate 1004 can include, for example, materials (including amorphous high index glass substrates) such as materials based on silica glass (e.g., doped silica glass), silicon oxynitride, transition metal oxides (e.g., hafnium oxide, tantalum oxide, zirconium oxide, niobium oxide, aluminum oxide (e.g., sapphire)), plastic, a polymer, or other materially optically transmissive to visible light having, e.g., a suitable refractive index as described above, that is different from the material of the Li-based oxide features 1008.

However, as described above, in various implementations described herein, the diffraction gratings 1008 and the substrate 1004 or waveguide both comprise the same material, e.g., a Li-based oxide. In some implementations, the diffraction gratings 1008 are patterned directly into the substrate 1004, such that the diffraction gratings 1008 and the substrate 1004 form a single piece or a monolithic structure. For example, the substrate 1004 comprises a waveguide having the diffraction grating 1008 formed directly in the surface of the waveguide or substrate. In these implementations, a bulk Li-based oxide material may be patterned at the surface 1004S to form the diffraction gratings 1008, while the Li-based oxide material below the diffraction gratings 1008 may form a waveguide. In yet some other implementations, the bulk or substrate 1004 and the surface 1004S patterned to form the diffraction gratings 1008 comprise different Li-based oxides. For example, a bulk Li-based oxide material patterned at the surface region to form the diffraction gratings 1008 may be formed of a first Li-based oxide material, while the Li-based oxide material below the diffraction gratings 1008 that form the substrate 1004 or the substrate region may be formed of a second Li-based oxide material different from the first Li-based oxide material. As discussed above, in some other implementations, the diffraction gratings 1008 comprise of different high-index material such as zirconium dioxide (ZrO$_2$), titanium dioxide (TiO$_2$), silicon carbide (SiC), etc. and the material below the diffraction gratings 1008 that form the substrate 1004 or the substrate region may be formed of a second material such as LiTaO$_3$, LiNbO$_3$, etc. and different from the first material coated as a thin film.

In the illustrated example in FIGS. 10A and 10B, the diffraction grating 1008 may include a plurality of blazed diffraction grating lines that are elongated in a first horizontal direction or the y-direction and periodically repeat in a second horizontal direction or the x-direction. The diffraction grating lines can be, e.g., straight and continuous lines extending in the y-direction. However, embodiments are not so limited. In some implementations, the diffraction grating lines can be discontinuous lines, e.g., in the y direction. In some other implementations, the discontinuous lines can form a plurality of pillars protruding from a surface of the grating substrate. In some implementations, at least some of the diffraction grating lines can have different widths in the x-direction.

In the illustrated example, the diffraction grating lines of the diffraction grating 1008 have a profile, e.g., a sawtooth profile, having asymmetric opposing side surfaces forming different angles with respect to a plane of the substrate. However, embodiments are not so limited and in other implementations, the diffraction grating lines can have symmetric opposing side surfaces forming similar angles with respect to a plane of the substrate.

Referring to FIGS. 10A and 10B, according to various embodiments, the diffraction gratings 1008 may have various dimensions. For example, the diffractive features of the diffraction gratings 1008 may have a height (H) of 10 nm or 40 nm to 150 nm or 200 nm, 50 nm to 110 nm, 60 nm to 100 nm, 70 nm to 90 nm, or about 80 nm or a height in a range defined by any of these values, according to embodiments. This height may correspond to the height of the peaks 1003 and/or the depth of the grooves 1005. Such heights with a blaze geometry in high index material may provide a diffraction grating with reduced polarization sensitivity. Other heights, however, might be possible.

The diffraction gratings 1008 may have a pitch of 250 nm to 350 nm, 300 nm to 400 nm, 250 nm to 450 nm, or a pitch in any range defined by any of these values, according to various embodiments. Other pitches are also possible.

The diffraction gratings 1008 may have blaze angles of about 10 to 70 degrees (shallow size) and anti-blaze angles (steep side) of 140 to 70 degrees or any value in a range defined by these values. Values outside these ranges are also possible.

As shown in FIGS. 11A-11D, blazed diffraction gratings of either single-step or multi-step geometry may be formed. In the example shown in FIGS. 11A-11D, the gratings are formed by depositing blazed photoresist and then etching and patterning the photoresist.

Figure 11A:
FIG. 11A illustrates an etching process for forming a waveguide having disposed thereon a single-step blazed diffraction grating.

FIG. 11A illustrates the formation of a single-step blazed grating 1106 in a substrate 1104, which may be a waveguide 1004 (FIG. 10A). A patternable material such as photoresist 1102 may be deposited onto a substrate 1104, which may comprise a waveguide 1004. The patternable material/photoresist 1102 is patterned so as to have a shape of the blazed grating. Forming a blazed geometry in the photoresist 1102 may, in some implementations, involve imprinting a pattern such as a single-step "sawtooth" pattern in the photoresist 1102 (e.g., depositing photoresist on the substrate 1104 and then imprinting the blazed geometry). The photoresist 1102 may comprise a mask such as a hard mask. The patterned photoresist 1102 and the substrate 1104 may then be etched to form a blazed pattern in substrate 1106. Etching the photoresist 1102 and the substrate 1104 may involve a dry plasma or chemical etch and/or a wet chemical etch, for example. In some implementations, the etching illustrated in FIG. 11A may etch away material at a relatively constant rate, such that portions where the patterned photoresist was the thickest result in a relatively smaller amount of removal, e.g., negligible or no removal, of the material from the substrate, while portions where the patterned photoresist was the thinnest (or non-existent) result in a relatively large amount of removal of the material from the substrate or the deepest etches into the substrate.

Figure 11B:
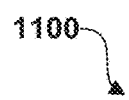
FIG. 11B is a scanning electronic micrograph of a single-step blazed photoresist grating.

FIG. 11B is a scanning electron micrograph of a blazed photoresist grating 1112, wherein a blazed grating pattern is formed in a photoresist 1104, for example by imprinting the photoresist with a patterned master. The diffraction grating 1112 shown has a single-step blazed geometry.

Figure 11C:
FIG. 11C illustrates an etching process for forming a waveguide having disposed thereon a multi-step blazed diffraction grating.
Figure 11D:
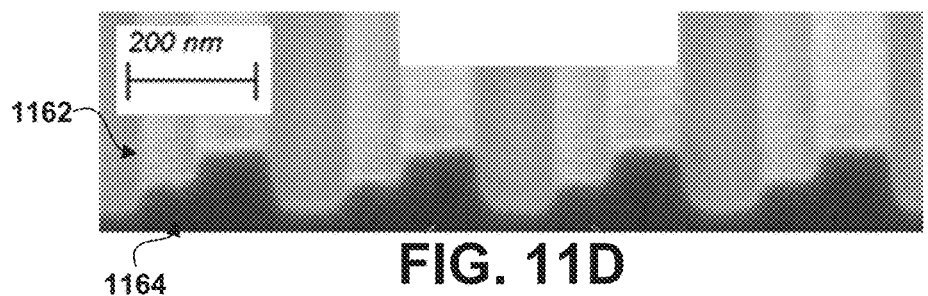
FIG. 11D is a scanning electronic micrograph of a multi-step blazed photoresist grating.

FIG. 11C illustrates the formation of a multi-step blazed grating 1156 in a substrate 1154, which may be a waveguide 1004 (FIG. 10A). A patternable material such as photoresist 1152 may be deposited onto a substrate 1154. The patternable material/photoresist 1152 is patterned so as to have a shape of the blazed grating. Forming the blazed photoresist 1152 may, in some implementations, involve imprinting a pattern such as a multi-step "sawtooth" pattern in the photoresist 1152 (e.g., depositing photoresist onto the substrate 1154 and then imprinting the blazed geometry). The patterned photoresist 1152 and the substrate 1154 may then be etched to form the multi-step blazed substrate 1156. The photoresist 1152 may comprise a mask such as a hardmask. The patterned photoresist 1152 and the substrate 1154 may then be etched to form a blazed pattern in the substrate 1156. Etching the photoresist 1152 and the substrate 1154 may involve a dry plasma or chemical etch and/or a wet chemical etch, for example. In some implementations, the etching illustrated in FIG. 11C may etch away material at a relatively constant rate, such that portions where the patterned photoresist was the thickest result in a relatively smaller amount of removal, e.g., negligible to no removal, of the material from the substrate, while portions where the blazed photoresist was the thinnest (or non-existent) result in a relatively large amount of removal of the material from the substrate or the deepest etches into the substrate.

FIG. 11D is a scanning electron micrograph of a blazed photoresist grating 1162 where the blazed grating pattern is formed on a photoresist 1164, for example, by imprinting the photoresist with a patterned master. The diffraction grating 1162 may have a multi-step blazed geometry. The width of the peak 1003 is shown to be about 200 nm.

Figure 11E:
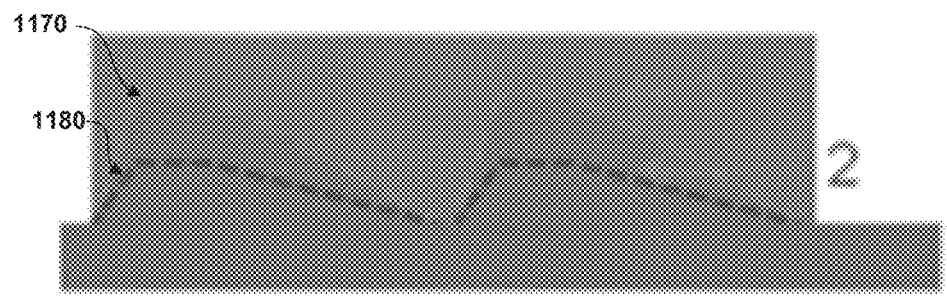
FIG. 11E illustrates a cross-sectional side view of two different blazed geometries for diffraction gratings.

As shown in FIG. 11E, the blazed geometry of a diffraction grating formed in the high index substrate, such as the grating 1008 of FIGS. 10A and 10B, can be varied to have different heights and/or blaze angles. In particular, FIG. 11E illustrates a first diffraction grating 1170 (e.g., geometry 1) having a first shape and having a first height (which may be approximately 80 nm in some implementations). FIG. 11E also illustrates a second diffraction grating 1180 (e.g., geometry 2) having a second shape and having a second height (which may be lower than the first height and which may be approximately 35 nm for some designs). As will be discussed in connection with at least FIG. 13, varying the geometry of the blazed diffraction grating may vary the performance characteristics of the grating. For example, the geometry 1 with a height (or depth) of 80 nm may provide a lower polarization sensitivity than the geometry 2 with a height (or depth) of 35 nm.

FIGS. 12A-12F show scanning electron micrographs (SEM) of various blazed diffraction gratings formed in substrates. The substrates and gratings of FIGS. 12A-12F are merely illustrative examples and, in general, the feature size, pitch, angles, and other characteristics may be varied to achieve desired performance characteristics.

Figure 12A:
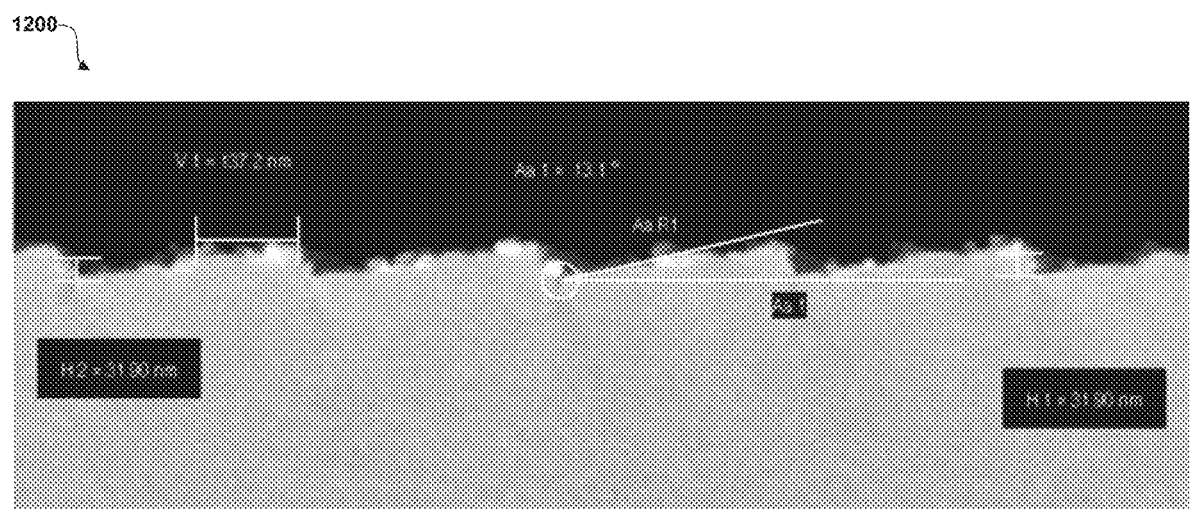
FIGS. 12A-12F show scanning electronic micrographs of various substrates with blazed diffraction gratings formed thereon having different blazed geometries.
Figure 12B:
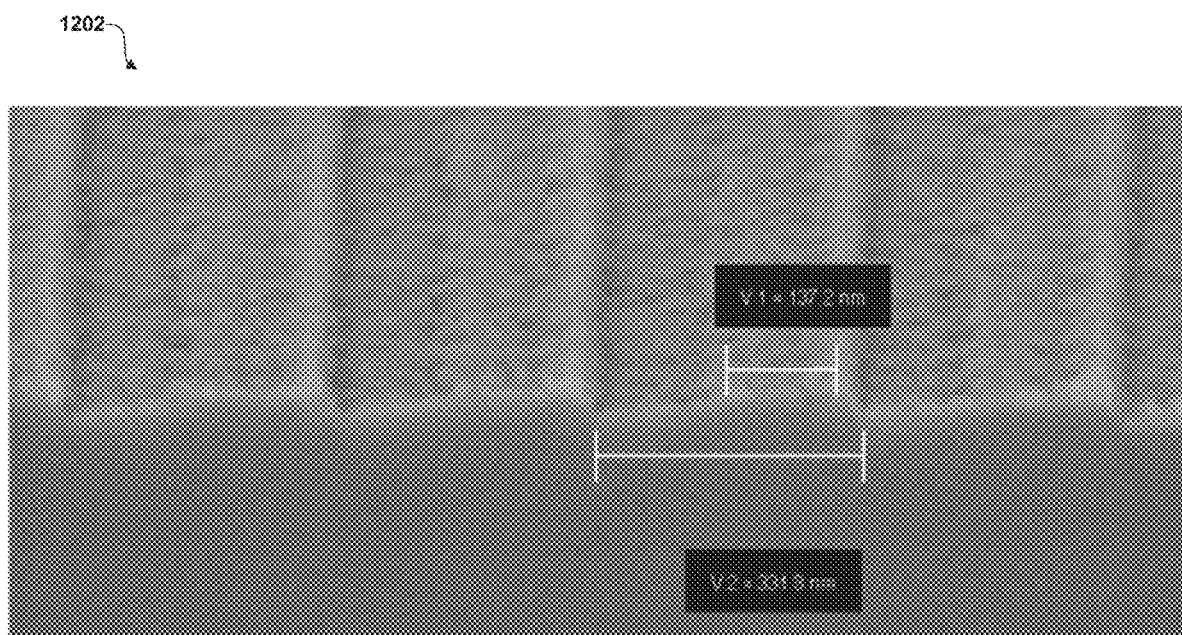
Figure 12C:
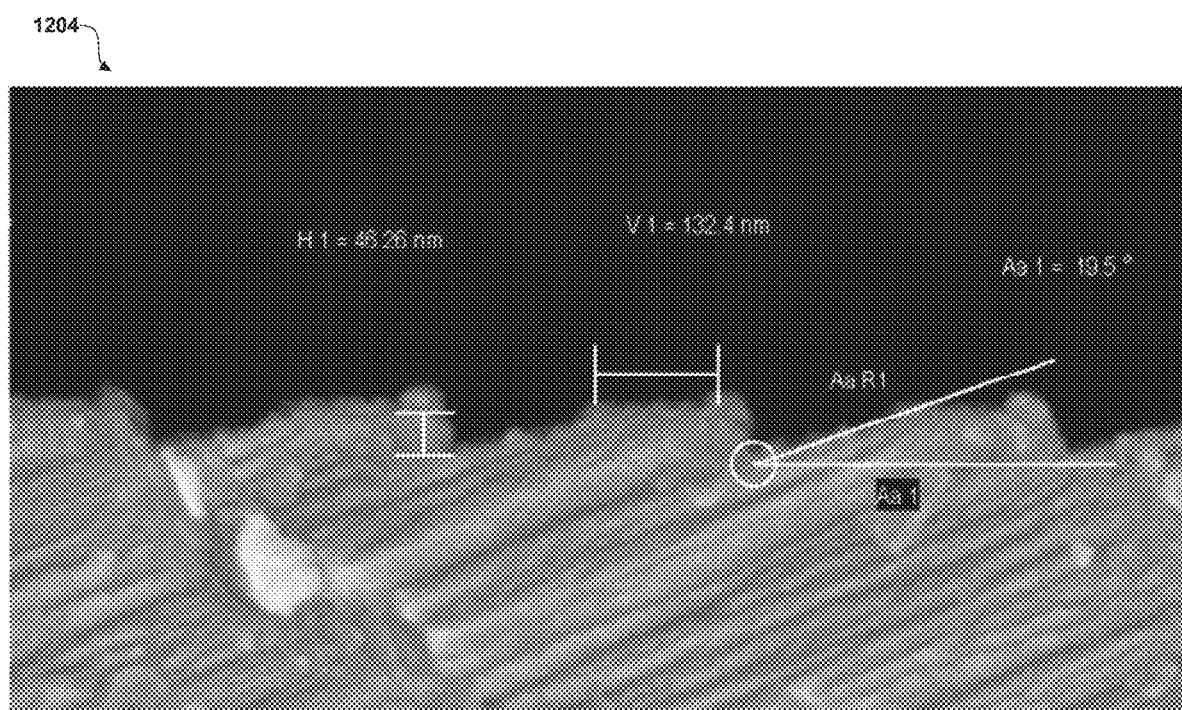

FIGS. 12A-12C show a lithium niobate (LiNbO$_3$) substrate having an upper surface having a shape of a blazed diffraction grating (e.g., a blazed geometry). FIG. 12A is a SEM image 1200 of a blazed diffraction grating formed in a lithium niobate (LiNbO$_3$) substrate wherein the step-height of the blazed grating or the height of the peak is measured to be about 31.90 nm. The angle, δ, of the first (shallower) sloping surface with respect to the plane of the substrate is approximately 12.1 degrees. (This angle, δ, may be referred to herein as the blaze angle.) FIG. 12B shows a SEM image 1202 of the blazed grating from a different perspective. FIG. 12B shows a pitch (e.g., a distance between peaks or steps or the minimums of the grooves) measured to be approximately 331.8 nm. In the SEM image 1204 shown in FIG. 12C, the blazed grating formed in the lithium niobate (LiNbO$_3$) substrate is shown to have a peak or step-height that measures to be about 46.26 nm. The angle, δ, of the first (shallower) sloping surface relative to the plane of the substrate is of about 19.5 degrees. (This angle, δ, may be referred to herein as the blaze angle.)

Figure 12D:
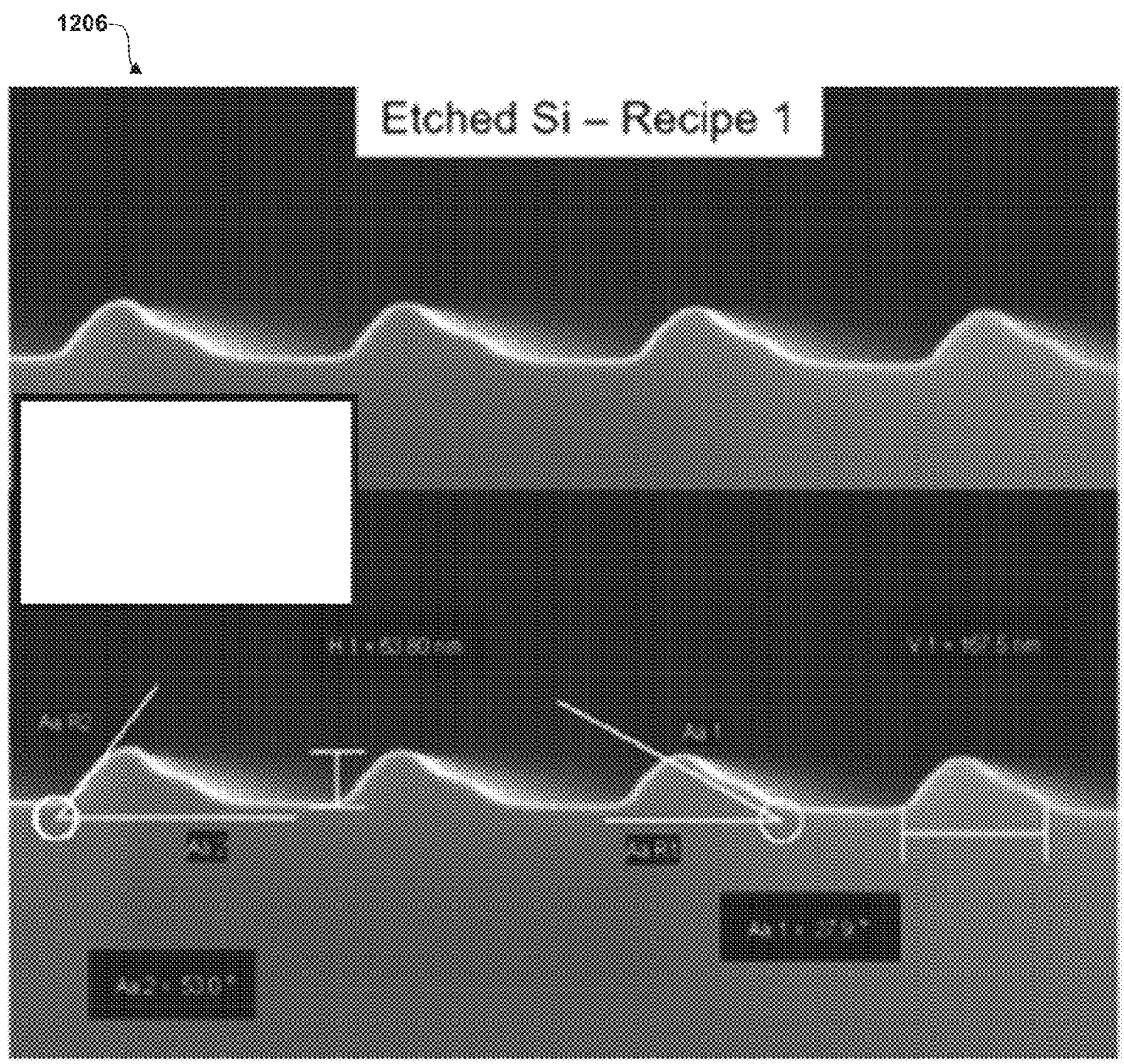

FIG. 12D shows SEM images 1206 of a silicon substrate etched to form a blazed diffraction grating therein. A height of the blazed diffraction features, e.g., the height of the peak or the depth of the groove, in the example of FIG. 12D is measured to be approximately 63.80 nm. The width of the peak is measured to be approximately 167.5 nm. The "steep" angle, for example, the angle of the second steeper sloping portion, of the peak is measured to be about 53.0 degrees (with respect to the extended plane of the substrate). The "shallow" angle, for example, the angle, δ, of the first shallower sloping portion (which may be referred to as the blaze angle), of the peak is measured to be about 27.9 degrees (with respect to the extended plane of the substrate).

Figure 12E:
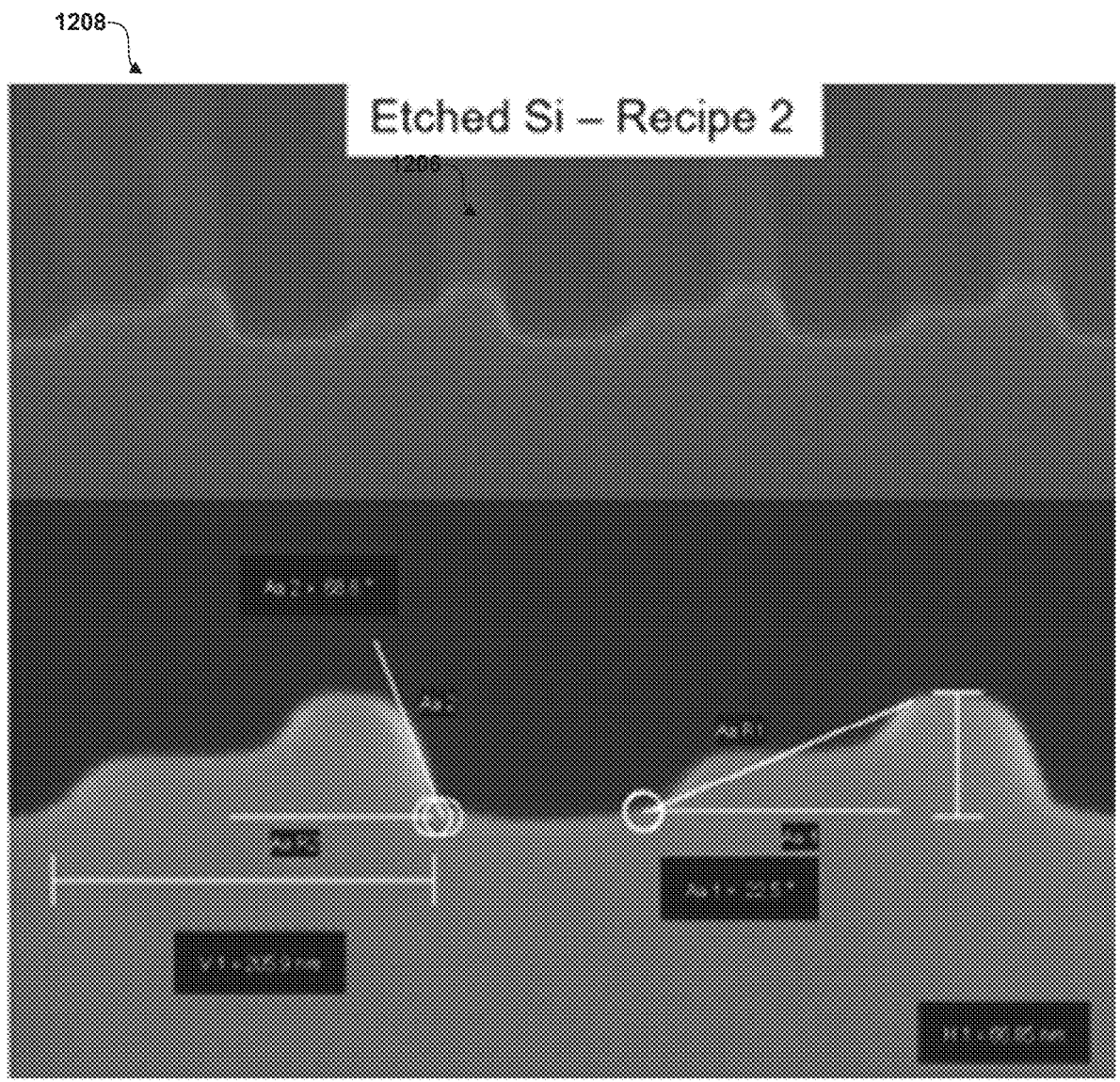

FIG. 12E shows SEM images 1208 of a silicon substrate etched to form therein a multi-step blazed diffraction grating. A height of the multi-step blazed feature e.g., the height of the peak or the depth of the groove, in the example of FIG. 12D is measured to be approximately 66.85 nm. The width of the multi-step blazed feature or peak is measured to be approximately 206.9 nm (e.g., the width not including any spacing between adjacent multi-step features). The overall "shallow" angle of the peak determined based on the height of the peak with respect to the distance from the base of the peak to the top of the peak is measured to be about 22.5 degrees (with respect to the extended plane of the substrate). The "steep" angle, for example, the angle of the second steeper sloping portion of the peak is measured to be about 68.8 degrees (with respect to the extended plane of the substrate).

Figure 12F:

FIG. 12F shows a SEM image 1210 of a substrate formed of a glass having refractive index (RI) of 1.8. The imaged substrate has formed therein a blazed diffraction grating having a step or feature height of approximately 87.09 nm.

In general, varying the geometry of a blazed diffraction grating such as the grating 1008 of FIGS. 10A and 10B can alter the performance characteristics of the grating. In at least some implementations, for example, a diffraction grating that is less sensitive to the polarization of light (e.g., a diffractive optical coupling element that in-couples or out-couples light relatively independently of the polarization of said light) may be obtained by suitably adjusting the parameters of the grating such as the thickness of the grating or height of the diffractive features. Diffraction gratings that have reduced polarization sensitivity may have a higher overall efficiency (e.g., may couple more light than more polarization-sensitive gratings) and may provide a more uniform image for viewers, as polarization-sensitive gratings may introduce undesirable coherent artifacts and reduce the uniformity of a far field image, for example, produced by an eyepiece of a head mounted display.

Figure 13:
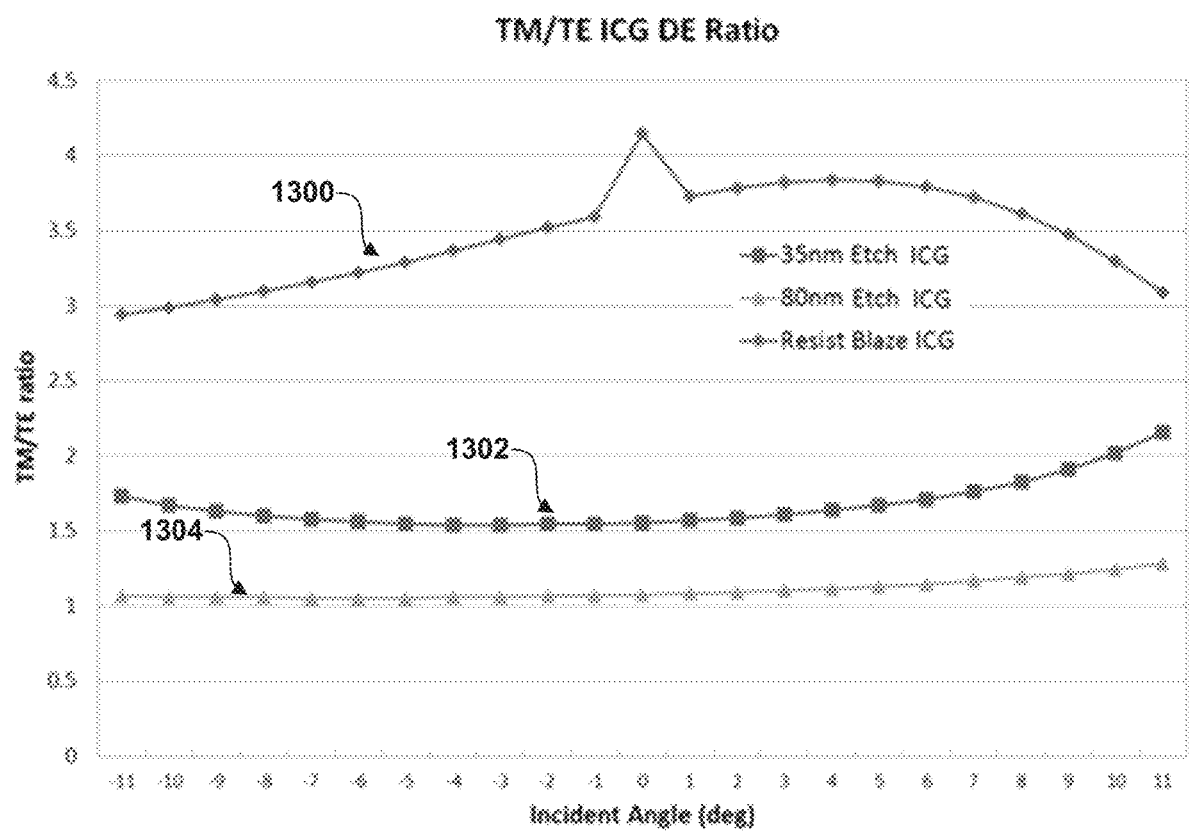
FIG. 13 is a plot of the ratio of the diffraction efficiency of transverse-magnetic (TM) polarized light versus the diffraction efficiency of transverse-electric (TE) polarized light as a function of incident angle for various diffraction gratings having different blazed geometries.

FIG. 13, for example, illustrates the polarization-sensitivity of various blazed diffraction gratings. In particular, FIG. 13 illustrates the TM/TE in-coupling grating diffraction efficiency (DE) ratio as a function of incident angle. The TM/TE ICG DE ratio may, for example, correspond to the in-coupling efficiency for transverse-magnetic (TM) polarized light divided by the in-coupling efficiency for transverse-electric (TE) polarized light. The incident angle may be the angle of incidence, a, e.g., as referenced in FIGS. 10A and 10B.

Plot 1300 illustrates the TM/TE ratio, as a function of the incident angle, a, for a blazed diffraction grating formed in photoresist disposed on a lithium niobate substrate. As shown in plot 1300, a diffraction grating formed from blazed photoresist on a lithium niobate substrate may be relatively polarization-sensitive, for example, having an efficiency for TM polarized light that is between 3-4 times greater than the grating's efficiency for TE polarized light within the range of the incident angle.

Plot 1302 illustrates the TM/TE ratio, as a function of incident angle, a, for a blazed diffraction grating comprising diffractive features formed in a lithium niobate substrate (such as the diffraction grating 1180 having the geometry 2 shown in FIG. 11E) having a feature or peak height (or groove depth), H, of 35 nm. As shown in plot 1302, the diffraction grating with a 35 nm etched feature height is less sensitive to polarization than the blazed grating formed in a photoresist layer deposited on a lithium niobate substrate. Over most of the range of measured incident angles, the diffraction grating with the 35 nm etched feature height only moderately favors TM polarized light over TE polarized light in a ratio of approximately 1.5 to 2.0 or 2.2 (e.g., the grating thus has a moderately reduced polarization sensitivity).

Plot 1304 illustrates the TM/TE ratio, as a function of incident angle, a, for a blazed diffraction grating comprising diffractive features formed in a lithium niobate substrate (such as the diffraction grating 1170 having geometry 1 shown in FIG. 11E) having a feature or peak height (or groove depth), H, of 80 nm. As shown in plot 1304, the diffraction grating with an 80 nm etched diffractive feature height has a TM/TE diffraction efficiency ratio near 1 over a wide range of incident angles (e.g., the grating has reduced polarization sensitivity, for example, is substantially polarization insensitive).

Figure 14:
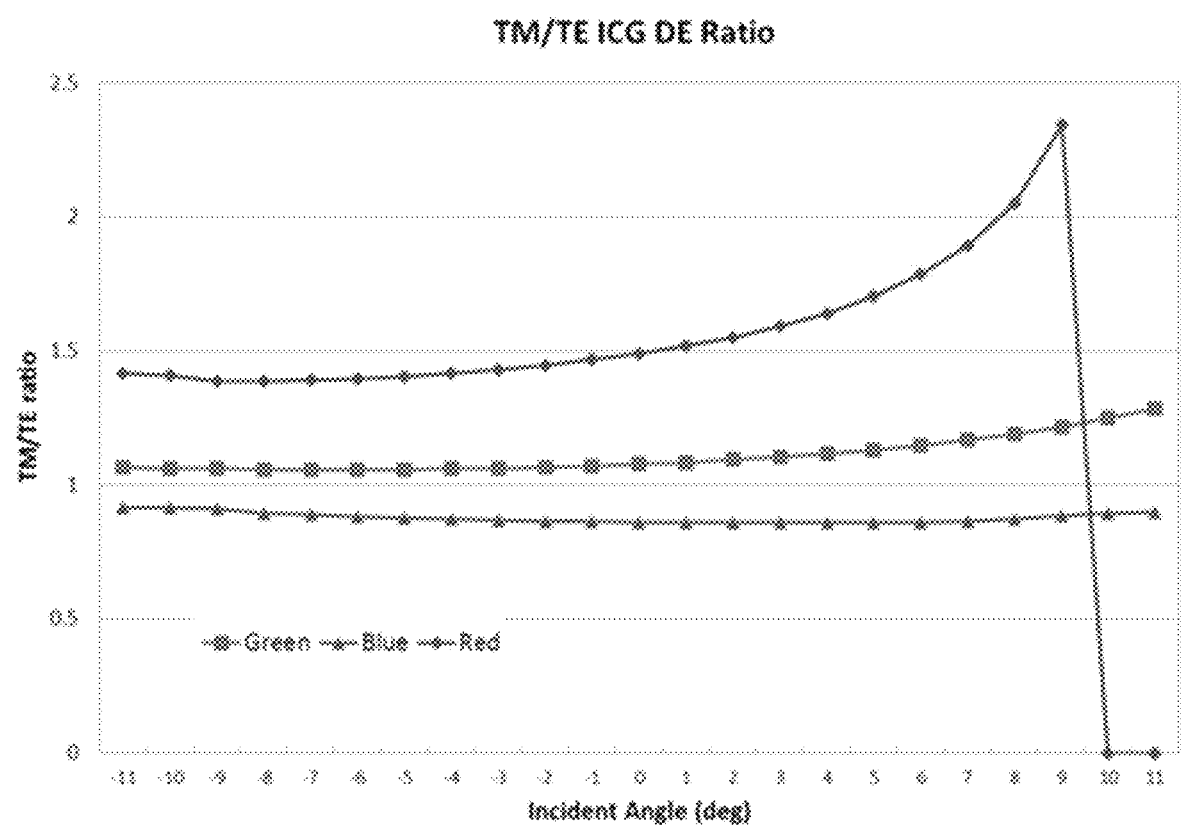
FIG. 14 is a plot of the ratio of the diffraction efficiency of transverse-magnetic (TM) polarized light versus the diffraction efficiency of transverse-electric (TE) polarized light as a function of incident angle for a diffraction grating having diffractive features with an 80 nm peak height or groove depth for green, blue, and red wavelengths.

FIG. 14 illustrates the TM/TE diffraction efficiency of a blazed diffraction grating formed in a lithium niobate substrate having an 80 nm feature height for different color light (e.g., for green light, blue light, and red light). As shown in FIG. 14, the TM/TE diffraction efficiency ratio (of diffraction grating 1170) is near 1 over a wide range of incident angles for both green and blue light. Additionally, for red light, the TM/TE diffraction efficiency ratio is generally around 1.5, with increases to above 2 (but less than 2.5) for certain incident angles.

Figure 15:
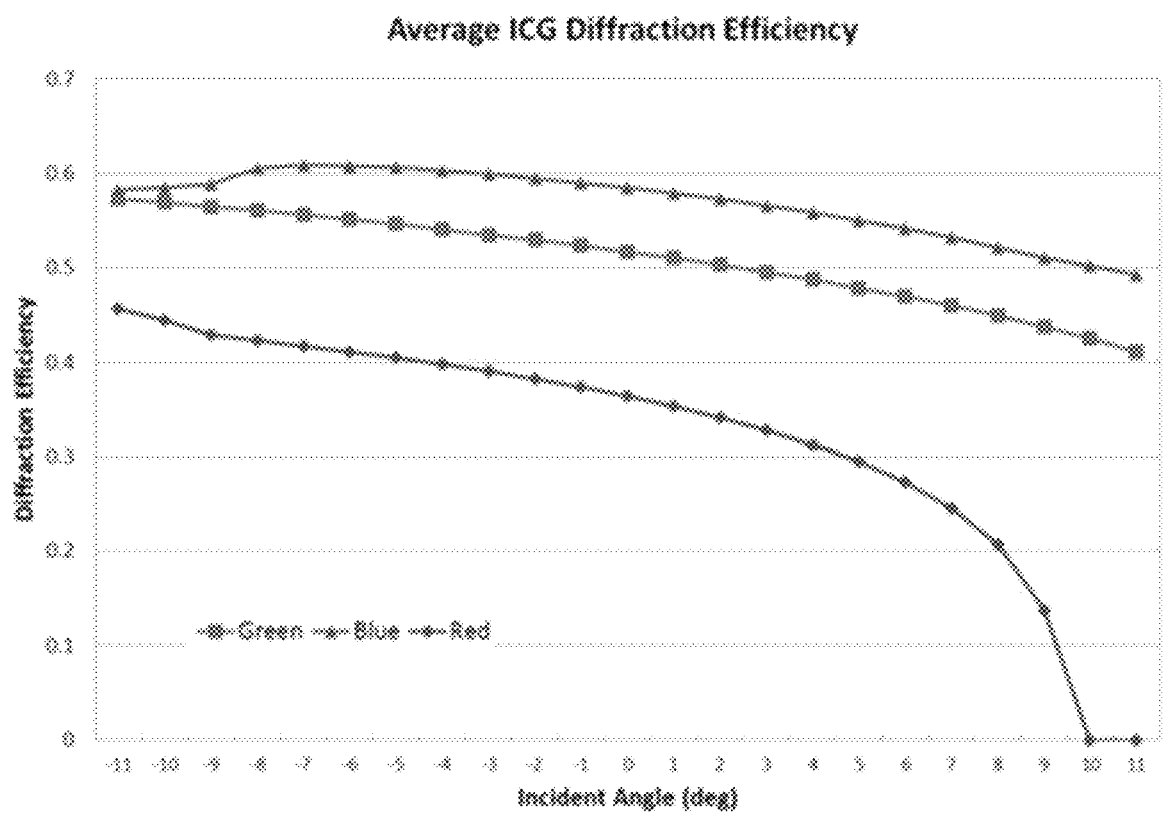
FIG. 15 is a plot of diffraction efficiency for a diffraction grating having an 80 nm peak height or groove depth for green, blue, and red wavelengths.

FIG. 15 illustrates the average diffraction efficiency of a blazed diffraction grating formed in a lithium niobate with an 80 nm feature height for green, blue, and red light as a function of incident angle. The average diffraction efficiency may, for example, be indicative of the efficiency of the diffraction grating at in-coupling (or out-coupling) unpolarized light.

Besides general reductions in efficiency and brightness, certain highly polarization-sensitive diffraction gratings may also create coherent artifacts and reduce the uniformity of a far field image produced by an eyepiece in a head mounted display that directs image content to the user's eye.

Figure 16:
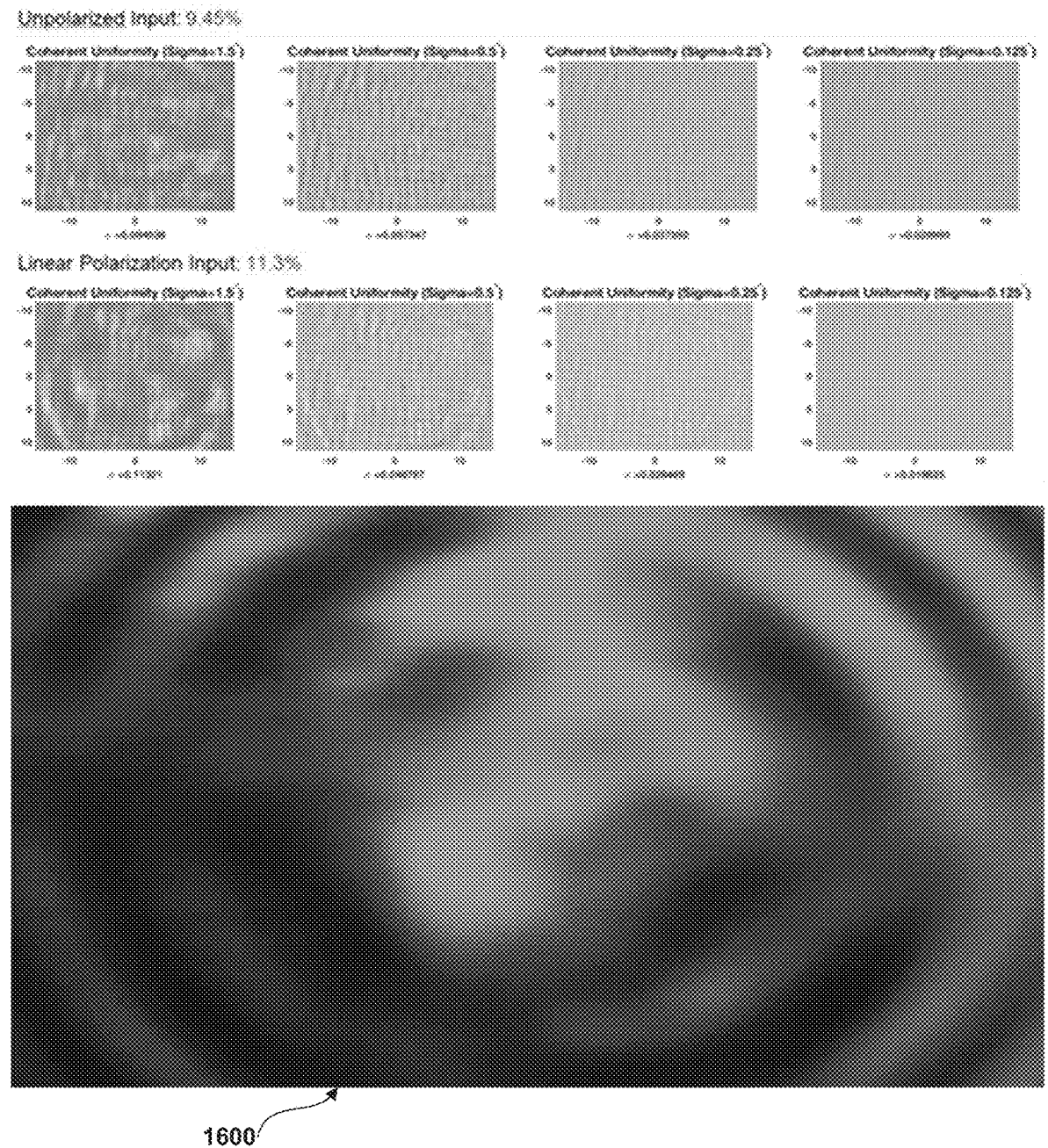
FIG. 16 illustrates coherent uniformity of a blazed photoresist diffraction grating for unpolarized input and linearly polarized input.

FIG. 16 shows distributions of light output from an eyepiece comprising an in-coupling grating comprising a blazed diffraction grating formed in photoresist deposited on a lithium niobate substrate for in-coupling light into the waveguide-based eyepiece as well as a light redirection element (orthogonal pupil expander) and an out-coupling optical element (exit pupil expander). As shown in FIG. 16, an eyepiece with an in-coupling optical element comprising a blazed diffraction grating in photoresist deposited on a lithium niobate substrate may produce coherent uniformity of approximately 9.45% for unpolarized input and of approximately 11.3% for linearly polarized input. The graphs and images of FIG. 16 are obtained from a 500 micron thick Z-cut lithium niobate substrate having layer of photoresist thereon that was patterned by imprinting to form the in-coupling grating. FIG. 16 shows a non-uniformity in the far field image 1600. In this example, the uniformity score that is plotted is a mathematical value derived from analyzing the pixel values of images captured over a certain area and gives an indication of the non-uniformity in the captured value at different sampling spatial frequency over the image. Lower values indicate more uniform color distribution over the field of view of the image captured or desired.

Figure 17:
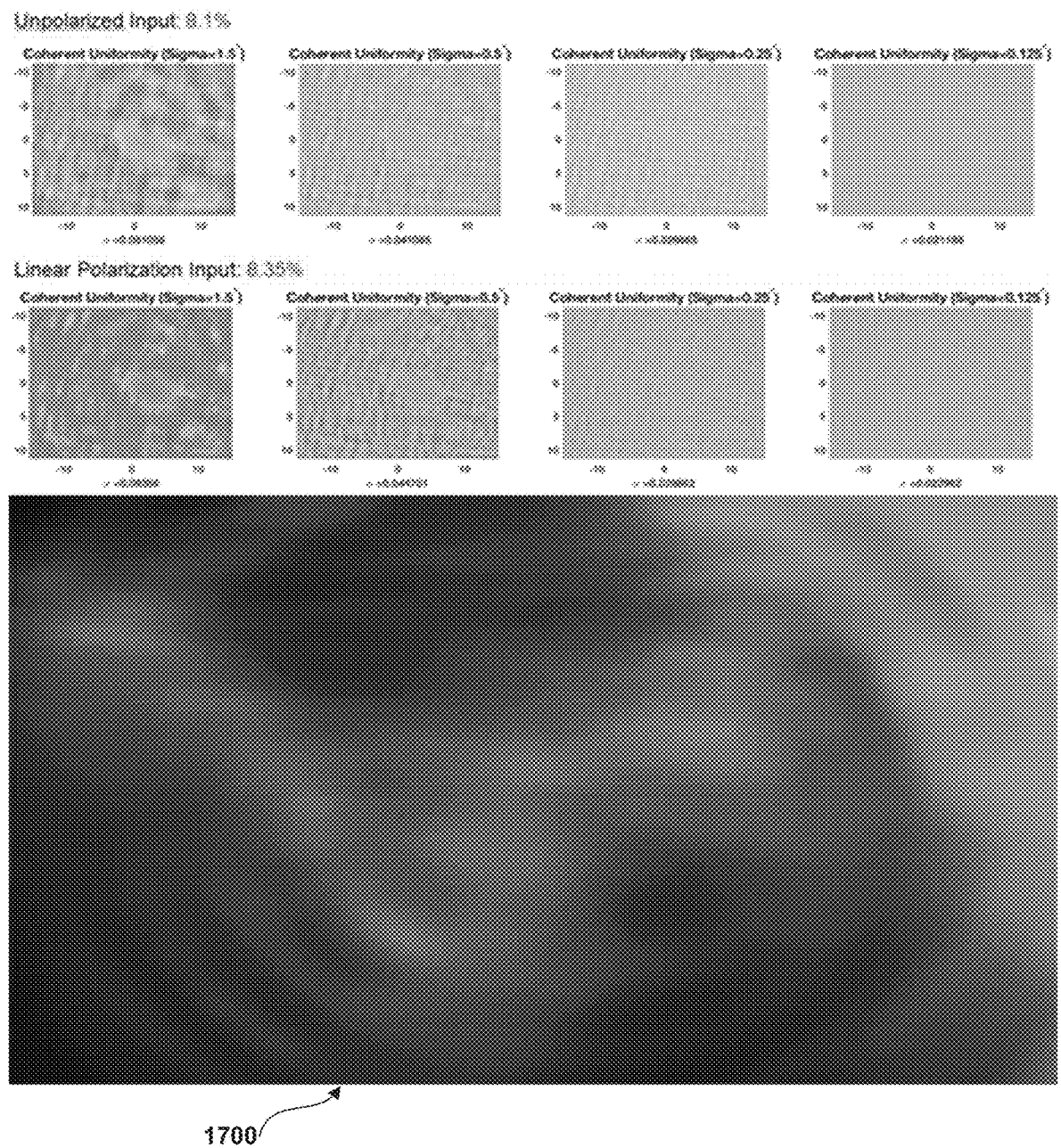
FIG. 17 illustrates coherent uniformity of a blazed diffraction grating etched in a lithium niobate substrate for unpolarized input and linearly polarized input.

FIG. 17 shows distributions of light output from an eyepiece comprising an in-coupling grating comprising a blazed diffraction grating formed in a lithium niobate substrate for in-coupling light into the waveguide based eyepiece as well as a light redirection element (orthogonal pupil expander) and an out-coupling optical element (exit pupil expander). As shown in FIG. 17, an in-coupling optical element comprising a blazed diffraction grating having an 80 nm feature height (peak height or groove depth) formed by etching into a lithium niobate substrate may have improved coherent uniformity such as a coherent uniformity of approximately 8.1% for unpolarized input and of approximately 8.35% for linearly polarized input. The graphs and images of FIG. 17 are obtained from a 500 micron thick Z-cut lithium niobate substrate with a blazed diffraction grating etched into the substrate. The EPE and OPE are also etched into the substrate. FIG. 17 shows a reduction in non-uniformity in the far field image 1700, relative to the far field image 1600.

Accordingly, a blazed grating formed in a high index substrate such as lithium niobate having certain dimensions, such as thickness around 40 to 120 or 60 to 100 or 70 to 90, or 80 nanometers, or any value in a range between any of these values, may provide for reduced polarization sensitivity.

The structures and methods of manufacturing thereof may differ from those examples specifically described above. For example, the blazed grating may be used as an out-coupling optical element (e.g., EPE) and/or a light redirecting optical element (e.g., OPE). Additionally, instead of a diffraction grating, other types of diffractive optical elements may be formed in the high index substrate, for example. Different high index materials may be used, such as for example, lithium tantalate (e.g., $LiTaO_3$) for the waveguide and the diffraction features formed therein. As discussed above, in some other implementations, the waveguide and diffractive features formed therein may comprise other high index materials such as silicon carbide or high index amorphous glass. Additionally, in some implementations, the diffraction gratings 1008 comprise of different high-index material or coating such as zinc oxide (ZnO), silicon nitride ($Si_3N_4$), zirconium dioxide ($ZrO_2$), titanium dioxide ($TiO_2$), silicon carbide (SiC), etc. and the material below that form the substrate 1004 or the substrate region may comprises a second high index material such as $LiTaO_3$, $LiNbO_3$, etc.

Diffraction Gratings Having Two-Dimensional (2D) Array of Diffractive Features

Various implementations of diffraction gratings having reduced polarization sensitivity can be implemented as a one dimensional (1D) array of diffractive features, e.g., lines, as described above. For example, FIG. 10A shows a cross-sectional side-view of an example device 1000 having a series of diffractive features 1012, which can have a "sawtooth" shape having sloped sidewalls, and are arranged laterally in one direction (e.g., a first horizontal or the x direction in FIG. 10A). The diffractive features 1012 undulate in one direction (e.g., the first horizontal or the x direction in FIG. 10A) or are elongated in one direction (e.g., the second horizontal or the y direction in FIG. 10A) and are thus referred to as being 1D. As a further example of 1D diffractive features, FIG. 11B shows a perspective view of a blazed photoresist grating configured as a 1D array. The diffractive features 1012 (FIG. 10A) can form a series of elongate longitudinal features such as lines extending in one direction (e.g., a second horizontal or the y direction in FIG. 10A). The elongate longitudinal features are arranged along one direction (e.g., the first horizontal or the x direction in FIG. 10A) and repeat in that direction.

In some embodiments, an array of structures can also be arranged in two directions to form a two dimensional (2D) array of diffractive features. The 2D array of diffractive features can include undulations in two directions. In some instances, the undulations can be periodic, while in other instances, the pitch of the undulations can vary in at least one direction. According to various examples described herein, the diffractive features have opposing sidewalls that are asymmetrically angled or tilted. According to various examples described herein, the diffractive features may be tapered. In some implementations, the diffractive features can have opposing sidewalls that are substantially angled or tilted. In some implementations, the opposing sidewalls may be tilted in the same direction, while in other implementations, the opposing sidewalls may be tilted in opposite directions. In some other implementations, the diffractive features can have one of the opposing sidewalls that is substantially tilted, while having the other of the sidewalls that is substantially vertical or orthogonal to the horizontal axis or is at least tilted less than the other sidewall. In various examples of 2D diffractive features described herein, the 2D diffractive features can be formed in or on the underlying substrate, which can be a waveguide, as described above for various examples of 1D diffractive features. For example, the 2D diffractive features can be etched into the underlying substrate or be formed by patterning a separate layer formed thereon. Thus, the 2D diffractive features can be formed of the same or different material as the material of the substrate, in a similar manner as described above for various 2D diffractive features. Other variations and configurations are possible.

Figure 18:
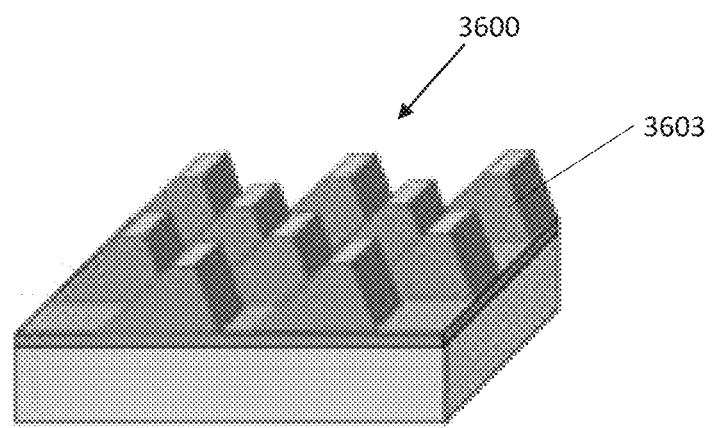
FIG. 18 is a perspective view of a two-dimensional (2D) diffraction grating comprising a two-dimensional array of blazed diffractive features.

FIG. 18 shows an example device 3600 having a 2D array of diffractive features 3603 (e.g., diffractive features 3603 arranged laterally in two dimensions or directions). In this example, the array resembles a checkered board pattern. The diffractive features 3603 may be referred to as protrusions. The diffraction features have sloping sidewalls that are sloped in opposite directions. One of the sidewall slopes may have a slope that is less than the other of the sidewall slopes. The result of this configuration is that the diffractive features are blazed.

Figure 18A:
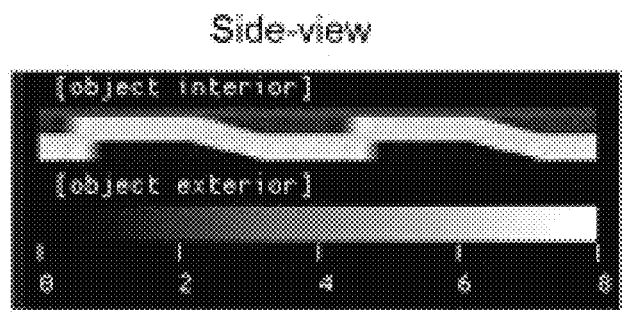
FIGS. 18A and 18B are cross sectional and plan view, respectively, of a 2D diffraction grating having a two-dimensional array of blazed diffractive features.
Figure 18B:
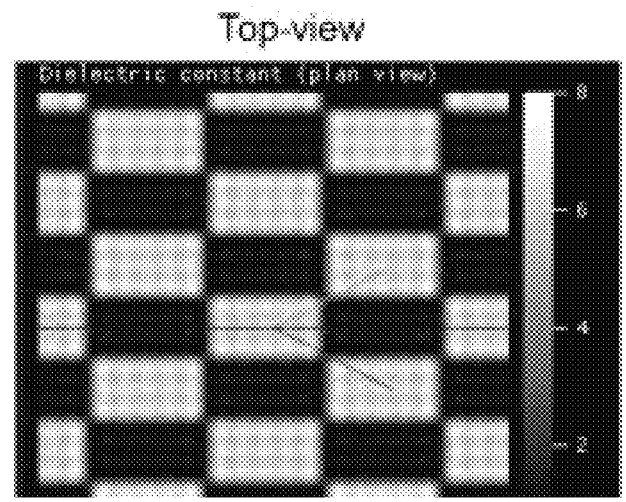

The diffractive features in the illustrated example of FIG. 18 are asymmetric in at least one lateral direction. FIGS. 18A and 18B show respectively a cross-sectional side-view and a top-view of an example array of asymmetric diffractive features. This 2D diffraction grating comprises a blazed diffraction grating. The diffractive features may be tapered, e.g., in thickness, with height. In the example shown in FIG. 18, the diffractive features have two opposing sloping sidewalls or facets with one sloping more than the other and tilted in opposite directions, while in the example shown FIGS. 18A and 18B, one sidewall is sloped while the other opposite sidewall is substantially vertical or not sloped, or has a negligible slope on the second sidewall. In both cases, the slope of one of the opposing sidewalls is greater than that (if any) of the other of the opposing sidewalls, such that the diffractive feature is asymmetric and blazed. As a result, the diffraction features preferentially diffract light in one direction over other directions. Such a diffraction grating may be useful, for example, as an incoupling optical element configured to diffract light received from a projector toward a light distribution element, an outcoupling optical element or a combination of a light distribution element and an outcoupling optical element, e.g., a combined pupil expander-extractor (CPE). Such a diffraction grating may be useful for outcoupling light to the eye as opposed to the opposite direction to the environment or world in front of the user and head mounted display. The sidewall tilt angle is less than 30 degrees relative to the horizontal axis on one side and greater than 80 degrees (e.g., between 80 and 90 degrees) on the other side, in some implementations. However, other tilts and tilt angles are possible. In some instances, the diffractive features can form a 2D array of sawtooth structures such as sawtooth nanostructures.

Accordingly, in various implementations, a 2D array of symmetric or asymmetric diffraction features can serve as a blazed diffraction grating. As discussed above, the shape (e.g., tilt angles of sidewalls) of the diffraction grating can determine the direction the grating directs the light or preferentially directs light towards. For example, the grating may direct more light toward other gratings (e.g., EPEs, OPEs, or CPEs) and/or toward the viewer. In some instances, the diffraction features can be faceted to bias the propagation of light in two or more directions (e.g., blazed in multiple directions). For example, FIG. 19A shows an example device 3700 having a 2D array of diffractive features 3703 formed in or on the substrate 3701. The diffractive feature 3703 has a first sidewall or facet 3703b-1 and a second sidewall or facet 3703b-2 that are tilted. Accordingly, the diffractive features are tapered, e.g., in thickness, with height. The diffractive feature 3703 can be configured to direct light preferentially in directions based on the tilt angles of the first and second sidewalls or facets 3703b-1, 3703b-2. FIG. 19B shows an example diffractive feature directing more light in two particular directions (as illustrate by the two thick solid arrows directed upward to the right and downward to the left). Other examples are possible.

Accordingly, any of the structures or devices described herein such as grating structures may comprise a 1D grating. Similarly, any of the structures or devices described herein such as grating structures may comprise a 2D grating. Such 2D gratings may spread the light. These gratings may also comprise blazed gratings. Such blazed gratings may preferentially direct light in certain directions. In some implementations, the 2D gratings (e.g., having one tilted facet on the diffractive features) preferentially direct light in one direction while in others the 2D grating (e.g., having two tilted facets on the diffractive features differently) preferentially direct light into a plurality of directions. Likewise, any of the methods or processes described herein can be used for 1D gratings. Similarly, any of the methods or processes described herein can be used for 2D gratings. These gratings, 1D or 2D, may be included in or on a substrate and/or waveguide and may be included in an eyepiece and possibly integrated into a head-mounted display as disclosed herein. These gratings may be employed as input gratings (e.g., ICGs), output gratings (EPEs), light distribution gratings (OPEs) or combined light distribution gratings/output gratings (e.g., CPEs).

Figure 20A:
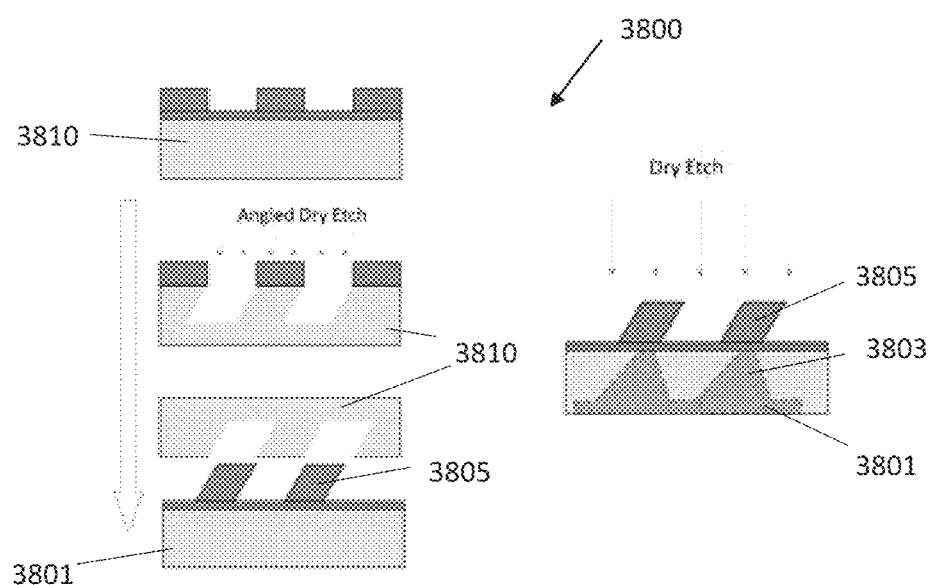
FIGS. 20A and 20B are schematic illustrations of methods of manufacturing a blazed diffraction grating using a master template.

FIG. 20A shows an example method 3800 of forming a blazed grating. The method 3800 includes providing a template or master 3810. If the diffractive features are to be angled, slanted, or tilted, the template 3810 can be patterned to form angled structures. Various processes, for example, etching processes, may be directional and angled to form such angled structures. Some examples of angled processes such as angled etching process include ion beam milling, angled dry etching, ion etching, GLAD etching, tilted etching, Faraday cage etching, etc. In some implementations, the selection of material employed for the template 3810 may assist in producing angled structures having angled sidewalls in the template. In this example, the angled structures comprise angled elongate protrusions (e.g., for 1D gratings) or angled pillars (e.g., for 2D gratings). These angled elongate protrusions or angled pillars may have sidewalls that are tilted in the same direction and in some cases may be substantially parallel. Once the template 3810 is fabricated, a layer of patternable material (e.g., polymer, resist, photoresist, etc.) can be deposited on a substrate 3801 and this layer can be imprinted with an imprint template 3810. The template 3810 can be imprinted into the patternable material (e.g., resist material) 3805 on a substrate 3801 to form a mask 3805 for the substrate. In other implementations, the patternable material can be deposited on the template and the substrate can be contacted to the template with the patternable material thereon. The template can be removed and the resist material 3805 and underlying substrate 3801 can be dry etched to form the diffractive features 3803 in the substrate 3801. In various implementations, dry etching is employed such as shown. The etching may be directional. In the example shown, the etching process is not angled. The resultant diffractive features 3803 formed in the substrate 3801 (or in a layer of material disposed on the substrate 3801) may have certain shapes, for example, may be blazed as a result of the angled feature in the mask 3805. In the example shown, the cross-section of the diffractive features has a trapezoidal or substantially triangular shape with two sloping sides. The sides slope in opposite directions. In the example shown, one side is sloped more than the other creating the blazed structure. This process may be used to form a 1D or 2D array of diffractive features.

Figure 20B:
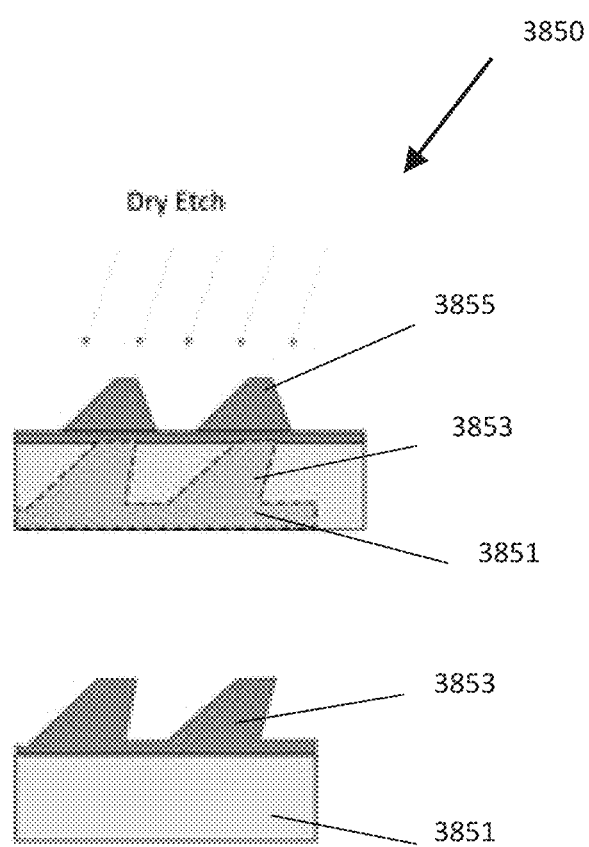

FIG. 20B shows another example method 3850 of forming blazed diffractive features. The mask 3855 and underlying substrate 3851 can be etched (e.g., dry etched) at an angle to form the diffractive features 3853 in the substrate 3851 (or in a layer of material disposed on the substrate 3851). In an angled etching process, the direction of the etchant forms a slanted angle with respect to a surface normal direction of the substrate 3851, which can be due to either a tilt in the angle of incidence of the etchant or a tilt in the surface of the substrate 3851. Some examples of angled directional etching processes (e.g., angled etching) include ion beam milling, angled dry etching, ion etching, GLAD etching, tilted etching, Faraday cage etching, etc. The template may comprise elongate protrusions (e.g. for 1D gratings) or tapered pillars (e.g. for 2D gratings) comprising trapezoidal or substantially triangular cross-sections. These elongate protrusions or tapered pillars may have sidewalls that are tilted in the opposite direction. One sidewall may be tilted more than the other. Applying an angled etching process to these elongate protrusions or tapered pillars may produce a blazed grating in a material, e.g., substrate or layer of material disposed on a substrate, underlying the elongate protrusions or tapered pillars. Blazed diffractive features having sides tilted in the same direction may be produced. In various implementations, one of the sides is tilted more than the other side. This process may be used to form a 1D or 2D array of diffractive features.

Figure 21:
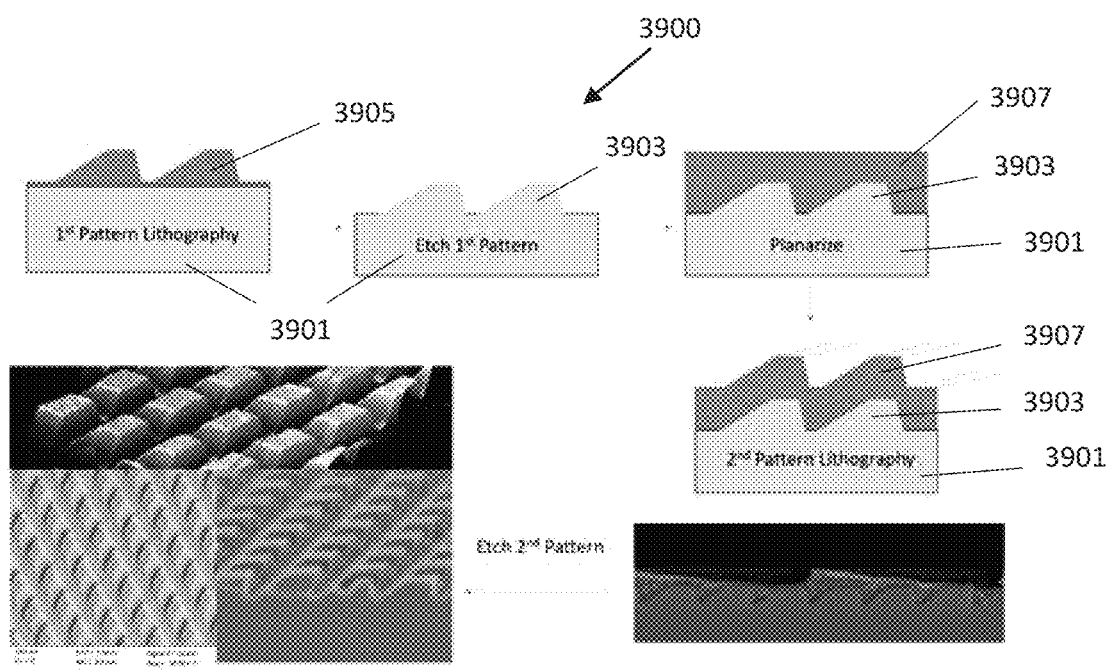
FIG. 21 is a schematic illustration of a method of manufacturing a blazed diffraction grating using a different master template.

In various implementations, the resultant diffractive features may be blazed in two or more directions (e.g., as shown in FIG. 19A) as a result of the angled features in the mask (e.g., as shown in FIG. 20A) and/or as a result of using an angled process (e.g., as shown in FIG. 20B). Diffractive features or gratings blazed in two or more directions may be produced by etching twice. In some implementations, for example, diffractive features or gratings blazed in two or more directions may be produced by etching with a first masked and etching again with a second different mask. In some instances, as shown in FIG. 21, the mask 3905 and substrate 3901 may be etched to form the first sidewall of the diffractive feature 3903 in the substrate 3901. Additionally, patterning may be provided to form the second sidewalls. In various implementations, a second mask having a different orientation and/or shape may be used to form the second sidewalls. The second mask (e.g., at an angle and/or different orientation with respect to the first sidewall) may for example be etched to form the second sidewall. In some implementations, after the first sidewall of the diffractive features 3903 is formed, a planarization layer 3907 may be added to the intermediate diffractive feature 3903 and substrate 3901. The planarization layer 3907, intermediate diffractive feature 3903, and/or substrate 3901 may be patterned and etched (e.g., at an angle with respect to the first sidewall) to form the second sidewall. Although the above example is discussed in the context of patterning the substrate, in some implementations, the processes described above may be employed to pattern a layer formed on the substrate and not the substrate. Alternatively, in some implementations, the processes described above may be employed to pattern a layer formed on the substrate as well as the substrate.

Additionally, although the example methods 3800, 3850, 3900 are illustrated to form a 2D array of asymmetric diffractive features, the methods can also be used to form a 2D array of symmetric diffractive features (with or without angled sidewalls). The methods can also be used to form a 1D array of diffractive features. In some instances, the diffractive features in the 1D array can be symmetric with or without angled sidewalls. In some instances, the diffractive features in the 1D array can be asymmetric, e.g., with angled sidewalls. Accordingly, in some cases, blazed diffractive features may be formed.

Additional Examples—Part I

1. A head-mounted display system comprising:
a head-mountable frame;
a light projection system configured to output light to provide image content; and
a waveguide supported by the frame, the waveguide comprises a substrate comprising material having an index of refraction of at least 1.9 and a blazed diffraction grating formed in said substrate, said substrate configured to guide at least a portion of the light from said light projection system coupled into said waveguide,
wherein the blazed diffraction grating has a first diffraction efficiency for a first polarization over a range of angles of light incident thereon and has a second diffraction efficiency for a second polarization over the range of angles of light incident thereon, the first diffraction efficiency being between 1 and 2 times the second diffraction efficiency.

2. The head-mounted display system of Example 1, wherein the material having an index of refraction of at least 1.9 comprises a lithium-based oxide.

3. The head-mounted display system of Example 1 or 2, wherein the material having an index of refraction of at least 1.9 comprises lithium niobate.

4. The head-mounted display system of Example 1 or 2, wherein the material having an index of refraction of at least 1.9 comprises lithium tantalate.

5. The head-mounted display system of Example 1, wherein the material having an index of refraction of at least 1.9 comprises silicon carbide.

6. The head-mounted display system of Example 1, wherein the material having an index of refraction of at least 1.9 comprises zirconium dioxide.

7. The head-mounted display system of Example 1, wherein the material having an index of refraction of at least 1.9 comprises titanium dioxide.

8. The head-mounted display system of any of the Examples above, wherein the material has an index of refraction of at least 2.0 to 2.7.

9. The head-mounted display system of any of the Examples above, wherein the material has an index of refraction of at least 2.1 to 2.7.

10. The head-mounted display system of any of the Examples above, wherein the material has an index of refraction of at least 2.2 to 2.7.

11. The head-mounted display system of any of the Examples above, wherein the material has an index of refraction of at least 2.3 to 2.7.

12. The head-mounted display system of any of the Examples above, wherein the material has an index of refraction of at least 2.4 to 2.7.

13. The head-mounted display system of any of the Examples above, wherein the material has an index of refraction of at least 2.5 to 2.7.

14. The head-mounted display system of any of the Examples above, wherein the material has an index of refraction of at least 2.6 to 2.7.

15. The head-mounted display system of any of the Examples above, wherein said blazed diffraction grating comprises diffractive features comprising peaks spaced apart by a groove therebetween.

16. The head-mounted display system of any of the Examples above, wherein said blazed diffraction grating comprises diffractive features comprising a plurality of straight lines.

17. The head-mounted display system of any of the Examples above, wherein said blazed diffraction grating comprises diffractive features having a peak height or groove depth of 40 to 120 nm.

18. The head-mounted display system of any of the Examples above, wherein said blazed diffraction grating comprises diffractive features having a peak height or groove depth of 60 to 100 nm.

19. The head-mounted display system of any of the Examples above, wherein said blazed diffraction grating comprises diffractive features having a peak height or groove depth of 70 to 90 nm.

20. The head-mounted display system of any of the Examples above, wherein said blazed diffraction grating comprises diffractive features having a peak height or groove depth of about 80 nm.

21. The head-mounted display system of any of the Examples above, wherein said diffractive features are asymmetric.

22. The head-mounted display system of any of the Examples above, wherein said blazed diffraction grating has a pitch of 250 to 350 nm.

23. The head-mounted display system of any of the Examples above, wherein blazed diffraction grating has a pitch of 300 to 450 nm.

24. The head-mounted display system of any of the Examples above, wherein said substrate is planar and said blazed diffraction grating has a blaze angle of 10 to 30 degrees with respect to the plane of the substrate.

25. The head-mounted display system of any of the Examples above, wherein said substrate is planar and said blazed diffraction grating has a blaze angle of 15 to 25 degrees with respect to the plane of the substrate.

26. The head-mounted display system of any of the Examples above, wherein said substrate is planar and said blazed diffraction grating has a blaze angle of about 19.5 degrees with respect to the plane of the substrate.

27. The head-mounted display system of any of the Examples above, wherein the first diffraction efficiency is 1 to 1.5 times the second diffraction efficiency.

28. The head-mounted display system of any of the Examples above, wherein the first diffraction efficiency is 1 to 1.4 times the second diffraction efficiency.

29. The head-mounted display system of any of the Examples above, wherein the first diffraction efficiency is 1 to 1.3 times the second diffraction efficiency.

30. The head-mounted display system of any of the Examples above, wherein the first diffraction efficiency is 1 to 1.2 times the second diffraction efficiency.

31. The head-mounted display system of any of the Examples above, wherein the first diffraction efficiency is 1 to 1.1 times the second diffraction efficiency.

32. The head-mounted display system of any of the Examples above, wherein the range of angles is at least 6 degrees.

33. The head-mounted display system of any of the Examples above, 1 wherein the range of angles is at least 12 degrees.

34. The head-mounted display system of any of the Examples above, wherein the range of angles is at least 18 degrees.

35. The head-mounted display system of any of the Examples above, wherein the range of angles is at least 22 degrees.

36. The head-mounted display system of any of the Examples above, wherein the range of angles is between ±3 degrees with respect to the plane of the substrate.

37. The head-mounted display system of any of the Examples above, wherein the range of angles is between ±6 degrees with respect to the plane of the substrate.

38. The head-mounted display system of any of the Examples above, wherein the range of angles is between ±9 degrees with respect to the plane of the substrate.

39. The head-mounted display system of any of the Examples above, wherein the range of angles is between ±11 degrees with respect to the plane of the substrate.

40. The head-mounted display system of any of the Examples above, wherein the first and second polarizations comprise first and second linear polarizations having different polarization angles.

41. The head-mounted display system of any of the Examples above, wherein the first and second polarizations comprise first and second linear polarizations oriented in orthogonal directions.

42. The head-mounted display system of any of the Examples above, wherein the first and second polarizations comprise transverse magnetic and transverse electric polarizations, respectively.

43. The head-mounted display system of any of the Examples above, wherein the first and second polarizations comprise transverse electric and transverse magnetic polarizations, respectively.

44. The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

45. The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

46. The head-mounted display system of any of the Examples above, wherein the blazed diffraction grating has a diffraction efficiency for red wavelengths of light having the first polarization that is between 1 and 2 times a diffraction efficiency for the red wavelengths of light having the second polarization.

47. The head-mounted display system of any of the Examples above, wherein the blazed diffraction grating has a diffraction efficiency for green wavelengths of light having the first polarization that is between 1 and 1.5 times a diffraction efficiency for the green wavelengths of light having the second polarization.

48. The head-mounted display system of any of the Examples above, wherein the blazed diffraction grating has a diffraction efficiency for blue wavelengths of light having the first polarization that is between 0.7 and 1 times a diffraction efficiency for the blue wavelengths of light having the second polarization.

49. The head-mounted display system of any of the Examples above, wherein said waveguide is included in an eyepiece configured to direct light to an eye of a user wearing said head mounted display.

50. The head-mounted display system of Example 49, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user.

51. The head-mounted display system of Example 49 or 50, wherein said eyepiece comprises said at least one waveguide and said at least one waveguide is transparent to visible light such that the user can see through the waveguide.

52. The head-mounted display system of any of the Examples above, wherein said waveguide comprises an in-coupling optical element for coupling light from said light projection system into the waveguide to be guided therein.

53. The head-mounted display system of any of the Examples above, wherein said waveguide comprises an out-coupling optical element for coupling light from said light projection system out of the waveguide and directing said light to the user's eye to present said image content to the viewer.

54. The head-mounted display system of any of the Examples above, wherein said blazed diffraction gratings comprises an in-coupling grating (ICG) configured to in-couple light from said light projection system into said waveguide.

55. The head-mounted display system of any of the Examples above, wherein said blazed diffraction gratings comprises an out-coupling grating (EPE) configured to out-couple light from said light projection system guided within said waveguide out of said waveguide.

56. An optical waveguide comprising:
a substrate comprising material having an index of refraction of at least 1.9, said substrate configured to guide light coupled into said waveguide within said waveguide via total internal reflection; and
a blazed diffraction grating formed in said substrate,
wherein the blazed diffraction grating has a first diffraction efficiency for a first polarization over a range of angles for light incident thereon and has a second diffraction efficiency for a second polarization over the range of angles for light incident thereon, the first diffraction efficiency being between 1 and 2 times the second diffraction efficiency.

57. The optical waveguide of Example 56, wherein the material having an index of refraction greater than 1.9 comprises a lithium based oxide.

58. The optical waveguide of Example 56 or 57, wherein the material having an index of refraction greater than 1.9 comprises lithium niobate.

59. The optical waveguide of Example 56 or 57, wherein the material having an index of refraction greater than 1.9 comprises lithium tantalate.

60. The optical waveguide of Example 56, wherein the material having an index of refraction greater than 1.9 comprises silicon carbide.

61. The optical waveguide of Example 56, wherein the material having an index of refraction greater than 1.9 comprises zirconium dioxide.

62. The optical waveguide of Example 56, wherein the material having an index of refraction greater than 1.9 comprises titanium dioxide.

63. The optical waveguide of any of Examples 56-62, wherein said blazed diffraction grating comprises diffractive features having a peak height or groove depth of 40 to 120 nm.

64. The optical waveguide of any of Examples 56-63 above, wherein said blazed diffraction grating comprises diffractive features having a peak height or groove depth of 60 to 100 nm.

65. The optical waveguide of any of Examples 56-64, wherein said blazed diffraction grating comprises diffractive features having a peak height or groove depth of 70 to 90 nm.

66. The optical waveguide of any of Examples 56-65, wherein said blazed diffraction grating comprises diffractive features having a peak height or groove depth of about 80 nm.

67. The optical waveguide of any of Examples 56-66, wherein said diffractive features are asymmetric.

68. The head mounted display system of any of Examples 1-55 or the optical waveguide of any of Examples 56-67, wherein the blazed diffraction grating comprises diffractive features formed in a one-dimensional (1D) array.

69. The head mounted display system of any of Examples 1-55 or the optical waveguide of any of Examples 56-67, wherein the blazed diffraction grating comprises diffractive features formed in a two-dimensional (2D) array.

70. The head mounted display system of any of Examples 1-55 or the optical waveguide of any of Examples 56-67, wherein the blazed diffraction grating comprises diffractive features formed in a two-dimensional (2D) array comprising a square array.

71. The head mounted display system of any of Examples 1-55 or the optical waveguide of any of Examples 56-67, wherein the blazed diffraction grating comprises diffractive features formed in a two-dimensional (2D) array, wherein the blazed diffraction grating comprises a 1D grating.

72. The head mounted display system of any of Examples 1-55 or the optical waveguide of any of Examples 56-67, wherein the blazed diffraction grating comprises diffractive features formed in a two-dimensional (2D) array, wherein the blazed diffraction grating comprises a 2D grating.

73. The head mounted display system of any of Examples 1-55 or the optical waveguide of any of Examples 56-67, wherein the blazed diffraction grating comprises diffractive features formed in a two-dimensional (2D) array, wherein the blazed diffraction grating comprises a 2D grating comprising a square array.

74. The head mounted display system of any of Examples 1-55 or the optical waveguide of any of Examples 56-67, wherein said blazed diffraction grating is configured to direct light preferentially in at least two directions.

75. The head mounted display system of any of Examples 1-55 or the optical waveguide of any of Examples 56-67, wherein said blazed diffraction grating is blazed in two directions.

76. The head mounted display system of any of Examples 1-55 or the optical waveguide of any of Examples 56-67, wherein said blazed diffraction grating comprises in-coupling optical element disposed so as to receive light from an image source and couple said light into said substrate to be guided therein.

77. The head mounted display system of any of Examples 1-55 or the optical waveguide of any of Examples 56-67, wherein said blazed diffraction grating comprises an light distributing optical element disposed so as to receive light from an image source that is guided in said substrate and direct said light to an out-coupling optical elements to be coupled out of said substrate.

78. The head mounted display system of any of Examples 1-55 or the optical waveguide of any of Examples 56-67, wherein said blazed diffraction grating comprises an light distributing optical element disposed so as to receive light from an image source that is guided in said substrate and spread said light within said waveguide out to increase beam size or eye box size.

79. The head mounted display system of any of Examples 1-55 or the optical waveguide of any of Examples 56-67, wherein said blazed diffraction grating comprises an out-coupling optical element disposed so as to receive light from an image source that is guided in said substrate and couple said light out of said substrate.

80. The head mounted display system of any of Examples 1-55 or the optical waveguide of any of Examples 56-67, wherein said blazed diffraction grating comprises a combined light distributing/out-coupling optical element disposed so as to receive light from an image source that is guided in said substrate, spread said light out in at least two directions and couple said light out of said substrate.

81. The head mounted display system of any of Examples 1-55 or the optical waveguide of any of Examples 56-67, wherein said blazed diffraction grating comprises a combined pupil expander-extractor disposed so as to receive light from an image source that is guided in said substrate, spread said light out and couple said light out of said substrate.

Additional Examples—Part II

1. A head-mounted display system comprising:
   a head-mountable frame;
   a light projection system configured to output light to provide image content; and
   a waveguide supported by the frame, the waveguide comprises a substrate comprising material having an index of refraction of at least 1.9, said substrate configured to guide at least a portion of the light from said light projection system coupled into said waveguide;
   a layer disposed over said substrate; and
   a blazed diffraction grating formed in said layer,
   wherein the blazed diffraction grating has a first diffraction efficiency for a first polarization over a range of angles of light incident thereon and has a second diffraction efficiency for a second polarization over the range of angles of light incident thereon, the first diffraction efficiency being between 1 and 2 times the second diffraction efficiency.

2. The head-mounted display system of Example 1, wherein the substrate material having an index of refraction of at least 1.9 comprises a lithium-based oxide.

3. The head-mounted display system of Example 1 or 2, wherein the material having an index of refraction of at least 1.9 comprises lithium niobate.

4. The head-mounted display system of Example 1 or 2, wherein the material having an index of refraction of at least 1.9 comprises lithium tantalate.

5. The head-mounted display system of Example 1, wherein the material having an index of refraction greater than 1.9 comprises silicon carbide.

6. The head-mounted display system of Example 1, wherein the material having an index of refraction greater than 1.9 comprises titanium dioxide.

7. The head-mounted display system of Example 1, wherein the material having an index of refraction greater than 1.9 comprises zirconium dioxide.

8. The head-mounted display system of any of the Examples above, wherein the layer comprises zinc oxide.

9. The head-mounted display system of any of the Examples above, wherein the layer comprises silicon nitride.

10. The head-mounted display system of any of the Examples above, wherein the layer comprises zirconium dioxide.

11. The head-mounted display system of any of the Examples above, wherein the layer comprises titanium dioxide.

12. The head-mounted display system of any of the Examples above, wherein the layer comprises silicon carbide.

13. The head-mounted display system of any of the Examples above, wherein the layer has a refractive index that is lower than said substrate.

14. The head-mounted display system of any of the Examples above, wherein the substrate material has an index of refraction of at least 2.0 to 2.7.

15. The head-mounted display system of any of the Examples above, wherein the substrate material has an index of refraction of at least 2.1 to 2.7.

16. The head-mounted display system of any of the Examples above, wherein the substrate material has an index of refraction of at least 2.2 to 2.7.

17. The head-mounted display system of any of the Examples above, wherein the substrate material has an index of refraction of at least 2.3 to 2.7.

18. The head-mounted display system of any of the Examples above, wherein the substrate material has an index of refraction of at least 2.3 to 2.4.

19. The head-mounted display system of any of the Examples above, wherein the substrate material has an index of refraction of at least 2.3 to 2.5.

20. The head-mounted display system of any of the Examples above, wherein the substrate material has an index of refraction of at least 2.6 to 2.7.

21. The head-mounted display system of any of the Examples above, wherein said blazed diffraction grating comprises diffractive features comprising peaks spaced apart by a groove therebetween.

22. The head-mounted display system of any of the Examples above, wherein the said blazed diffraction grating comprises diffractive features comprising a plurality of straight lines.

23. The head-mounted display system of any of the Examples above, wherein said blazed diffraction grating comprises diffractive features having a peak height or groove depth of 40 to 120 nm.

24. The head-mounted display system of any of the Examples above, wherein said blazed diffraction grating comprises diffractive features having a peak height or groove depth of 60 to 100 nm.

25. The head-mounted display system of any of the Examples above, wherein said blazed diffraction grating comprises diffractive features having a peak height or groove depth of 70 to 90 nm.

26. The head-mounted display system of any of the Examples above, wherein said blazed diffraction grating comprises diffractive features having a peak height or groove depth of about 80 nm.

27. The waveguide of any of the Examples above, wherein said diffractive features are asymmetric.

28. The head-mounted display system of any of the Examples above, wherein said blazed diffraction grating has a pitch of 250 to 350 nm.

29. The head-mounted display system of any of the Examples above, wherein blazed diffraction grating has a pitch of 300 to 450 nm.

30. The head-mounted display system of any of the Examples above, wherein said substrate is planar and said blazed diffraction grating has a blaze angle of 10 to 30 degrees with respect to the plane of the substrate.

31. The head-mounted display system of any of the Examples above, wherein said substrate is planar and said blazed diffraction grating has a blaze angle of 15 to 25 degrees with respect to the plane of the substrate.

32. The head-mounted display system of any of the Examples above, wherein said substrate is planar and said blazed diffraction grating has a blaze angle of about 19.5 degrees with respect to the plane of the substrate.

33. The head-mounted display system of any of the Examples above, wherein the first diffraction efficiency is 1 to 1.5 times the second diffraction efficiency.

34. The head-mounted display system of any of the Examples above, wherein the first diffraction efficiency is 1 to 1.4 times the second diffraction efficiency.

35. The head-mounted display system of any of the Examples above, wherein the first diffraction efficiency is 1 to 1.3 times the second diffraction efficiency.

36. The head-mounted display system of any of the Examples above, wherein the first diffraction efficiency is 1 to 1.2 times the second diffraction efficiency.

37. The head-mounted display system of any of the Examples above, wherein the first diffraction efficiency is 1 to 1.1 times the second diffraction efficiency.

38. The head-mounted display system of any of the Examples above, wherein the range of angles is at least 6 degrees.

39. The head-mounted display system of any of the Examples above, 1 wherein the range of angles is at least 12 degrees.

40. The head-mounted display system of any of the Examples above, wherein the range of angles is at least 18 degrees.

41. The head-mounted display system of any of the Examples above, wherein the range of angles is at least 22 degrees.

42. The head-mounted display system of any of the Examples above, wherein the range of angles is between ±3 degrees with respect to the plane of the substrate.

43. The head-mounted display system of any of the Examples above, wherein the range of angles is between ±6 degrees with respect to the plane of the substrate.

44. The head-mounted display system of any of the Examples above, wherein the range of angles is between ±9 degrees with respect to the plane of the substrate.

45. The head-mounted display system of any of the Examples above, wherein the range of angles is between ±11 degrees with respect to the plane of the substrate.

46. The head-mounted display system of any of the Examples above, wherein the first and second polarizations comprise first and second linear polarization having different polarization angles.

47. The head-mounted display system of any of the Examples above, wherein the first and second polarizations comprise first and second linear polarization oriented in orthogonal directions.

48. The head-mounted display system of any of the Examples above, wherein the first and second polarization direction comprise transverse magnetic and transverse electric polarizations, respectively.

49. The head-mounted display system of any of the Examples above, wherein the first and second polarization direction comprise transverse electric and transverse magnetic polarizations, respectively.

50. The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

51. The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

52. The head-mounted display system of any of the Examples above, wherein said waveguide is included in an eyepiece configured to direct light to an eye of a user wearing said head mounted display.

53. The head-mounted display system of Example 52, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user.

54. The head-mounted display system of Example 52 or 53, wherein said eyepiece comprises said at least one waveguide and said at least one waveguide is transparent to visible light such that the user can see through the waveguide.

55. The head-mounted display system of any of the Examples above, wherein said waveguide comprises an in-coupling optical element for coupling light from said light projection system into the waveguide to be guided therein.

56. The head-mounted display system of any of the Examples above, wherein said waveguide comprises an out-coupling optical element for coupling light from said light projection system out of the waveguide and directs said light to the user's eye to present said image content to the viewer.

57. The head-mounted display system of any of the Examples above, wherein said blazed diffraction gratings comprises an in-coupling grating (ICG) configured to in-couple light from said light projection system into said waveguide.

58. The head-mounted display system of any of the Examples above, wherein said blazed diffraction gratings comprises an out-coupling grating (EPE) configured to out-couple light from said light projection system guided within said waveguide out of said waveguide.

59. An optical waveguide comprising:
a substrate comprising material having an index of refraction of at least 1.9, said substrate configured to guide light coupled into said waveguide within said waveguide via total internal reflection;
a layer disposed over said substrate;
a blazed diffraction grating formed in said layer,
wherein the blazed diffraction grating has a first diffraction efficiency for a first polarization over a range of angles for light incident thereon and has a second diffraction efficiency for a second polarization over the range of angles for light incident thereon, the first diffraction efficiency being between 1 and 2 times the second diffraction efficiency.

60. The optical waveguide of Example 59, wherein the material having an index of refraction greater than 1.9 comprises a lithium based oxide.

61. The optical waveguide of Example 59 or 60, wherein the material having an index of refraction greater than 1.9 comprises lithium niobate.

62. The optical waveguide of Example 59 or 60, wherein the material having an index of refraction greater than 1.9 comprises lithium tantalate.

63. The optical waveguide of Example 59, wherein the material having an index of refraction greater than 1.9 comprises silicon carbide.

64. The optical waveguide of Example 59, wherein the material having an index of refraction greater than 1.9 comprises titanium dioxide.

65. The optical waveguide of Example 59, wherein the material having an index of refraction greater than 1.9 comprises zirconium dioxide.

66. The optical waveguide of any of Examples 59-65, wherein the layer comprises zinc oxide.

67. The optical waveguide of any of Examples 59-66, wherein the layer comprises silicon nitride.

68. The optical waveguide of any of Examples 59-67, wherein the layer comprises zirconium dioxide.

69. The optical waveguide of any of Examples 59-68, wherein the layer comprises titanium dioxide.

70. The optical waveguide of any of Examples 59-69, wherein the layer comprises silicon carbide.

71. The optical waveguide of any of Examples 59-70, wherein the layer has a refractive index that is lower than said substrate.

72. The optical waveguide of any of Examples 59-71, wherein said blazed diffraction grating comprises diffractive features having a peak height or groove depth of 40 to 120 nm.

73. The optical waveguide of any of Examples 59-72, wherein said blazed diffraction grating comprises diffractive features having a peak height or groove depth of 60 to 100 nm.

74. The optical waveguide of any of Examples 59-73, wherein said blazed diffraction grating comprises diffractive features having a peak height or groove depth of 70 to 90 nm.

75. The optical waveguide of any of Examples 59-74, wherein said blazed diffraction grating comprises diffractive features having a peak height or groove depth of about 80 nm.

76. The optical waveguide of any of Examples 59-75, wherein said diffractive features are asymmetric.

77. The head mounted display system of any of Examples 1-58 or the optical waveguide of any of Examples 59-76, wherein the blazed diffraction grating comprises diffractive features formed in a one-dimensional (1D) array.

78. The head mounted display system of any of Examples 1-58 or the optical waveguide of any of Examples 59-76, wherein the blazed diffraction grating comprises diffractive features formed in a two-dimensional (2D) array.

79. The head mounted display system of any of Examples 1-58 or the optical waveguide of any of Examples 59-76, wherein the blazed diffraction grating comprises diffractive features formed in a two-dimensional (2D) array comprising a square array.

80. The head mounted display system of any of Examples 1-58 or the optical waveguide of any of Examples 59-76, wherein the blazed diffraction grating comprises diffractive features formed in a two-dimensional (2D) array, wherein the blazed diffraction grating comprises a 1D grating.

81. The head mounted display system of any of Examples 1-58 or the optical waveguide of any of Examples 59-76, wherein the blazed diffraction grating comprises diffractive features formed in a two-dimensional (2D) array, wherein the blazed diffraction grating comprises a 2D grating.

82. The head mounted display system of any of Examples 1-58 or the optical waveguide of any of Examples 59-76, wherein the blazed diffraction grating comprises diffractive features formed in a two-dimensional (2D) array, wherein the blazed diffraction grating comprises a 2D grating comprising a square array.

83. The head mounted display system of any of Examples 1-58 or the optical waveguide of any of Examples 59-76, wherein said blazed diffraction grating is configured to direct light preferentially in at least two directions.

84. The head mounted display system of any of Examples 1-58 or the optical waveguide of any of Examples 59-76, wherein said blazed diffraction grating is blazed in two directions.

85. The head mounted display system of any of Examples 1-58 or the optical waveguide of any of Examples 59-76, wherein said blazed diffraction grating comprises in-coupling optical element disposed so as to receive light from an image source and couple said light into said substrate to be guided therein.

86. The head mounted display system of any of Examples 1-58 or the optical waveguide of any of Examples 59-76, wherein said blazed diffraction grating comprises an light distributing optical element disposed so as to receive light from an image source that is guided in said substrate and direct said light to an out-coupling optical elements to be coupled out of said substrate.

87. The head mounted display system of any of Examples 1-58 or the optical waveguide of any of Examples 59-76, wherein said blazed diffraction grating comprises an light distributing optical element disposed so as to receive light from an image source that is guided in said substrate and spread said light within said waveguide out to increase beam size or eye box size.

88. The head mounted display system of any of Examples 1-58 or the optical waveguide of any of Examples 59-76, wherein said blazed diffraction grating comprises an out-coupling optical element disposed so as to receive light from an image source that is guided in said substrate and couple said light out of said substrate.

89. The head mounted display system of any of Examples 1-58 or the optical waveguide of any of Examples 59-76, wherein said blazed diffraction grating comprises a combined light distributing/out-coupling optical element disposed so as to receive light from an image source that is guided in said substrate, spread said light out in at least two directions and couple said light out of said substrate.

90. The head mounted display system of any of Examples 1-58 or the optical waveguide of any of Examples 59-76, wherein said blazed diffraction grating comprises a combined pupil expander-extractor disposed so as to receive light from an image source that is guided in said substrate, spread said light out and couple said light out of said substrate.

ADDITIONAL CONSIDERATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. An optical waveguide comprising:
a substrate configured to guide light coupled into the waveguide within the waveguide via total internal reflection; and
a blazed diffraction grating formed in the substrate or in a layer disposed over the substrate,
wherein the blazed diffraction grating has a first diffraction efficiency across a visible light spectrum for a first polarization over a range of angles for light incident thereon and has a second diffraction efficiency across the visible light spectrum for a second polarization over the range of angles for light incident thereon, the first diffraction efficiency being between 1 and 2 times the second diffraction efficiency.

2. The optical waveguide of claim 1, wherein the substrate comprises a material having an index of refraction of at least 1.9.

3. The optical waveguide of claim 1, wherein the blazed diffraction grating is formed in the substrate and arranged to optically communicate with the substrate.

4. The optical waveguide of claim 1, wherein the blazed diffraction grating is formed in the layer and arranged to optically communicate with the substrate.

5. The optical waveguide of claim 4, wherein the blazed diffraction grating is formed in the layer physically contacting the substrate.

6. The optical waveguide of claim 1, wherein the substrate comprises a lithium-based oxide, silicon carbide, zirconium dioxide or titanium dioxide.

7. The optical waveguide of claim 1, wherein the blazed diffraction grating is formed in the layer disposed over the substrate, and wherein the layer comprises silicon nitride, zirconium dioxide, titanium dioxide or silicon carbide.

8. The optical waveguide of claim 1, wherein the blazed diffraction grating is formed in the layer disposed over the substrate, and wherein the layer has a refractive index that is lower than the substrate.

9. The optical waveguide of claim 1, wherein the blazed diffraction grating comprises diffractive features having a peak height or groove depth of 10 to 150 nm.

10. The optical waveguide of claim 1, wherein the blazed diffraction grating comprises diffractive features comprising a plurality of continuous or discontinuous straight lines.

11. The optical waveguide of claim 1, wherein the blazed diffraction grating comprises diffractive features comprising a plurality of pillars protruding from a surface of the substrate.

12. The optical waveguide of claim 1, wherein the diffractive features are asymmetric.

13. The optical waveguide of claim 1, wherein the blazed diffraction grating comprises diffractive features formed in a one-dimensional (1D) array or a two-dimensional (2D) array.

14. The optical waveguide of claim 1, wherein the blazed diffraction grating comprises diffractive features formed in a two-dimensional (2D) array comprising a square array.

15. The optical waveguide of claim 14, wherein the blazed diffraction grating comprises a 1D grating or a 2D grating.

16. The optical waveguide of claim 15, wherein the blazed diffraction grating comprises the 2D grating comprising the square array.

17. The optical waveguide of claim 1, wherein the blazed diffraction grating is configured to direct light in two or more directions.

18. The optical waveguide of claim 1, wherein the blazed diffraction grating comprises one or both of:
an in-coupling optical element disposed so as to receive light from an image source and couple the light into the substrate to be guided therein; and
an out-coupling optical element disposed so as to receive light from an image source that is guided in the substrate and couple the light out of the substrate.

19. The optical waveguide of claim 1, wherein the blazed diffraction grating comprises a light distributing optical element disposed so as to receive light from an image source that is guided in the substrate and:
direct the light to an out-coupling optical element to be coupled out of the substrate; or
spread the light within the waveguide to increase beam size or eye box size.

20. The optical waveguide of claim 1, wherein the blazed diffraction grating comprises a combined pupil expander-extractor disposed so as to receive light from an image source that is guided in the substrate, spread the light out and couple the light out of the substrate.

* * * * *